US012577373B2

(12) United States Patent
Ebe et al.

(10) Patent No.: US 12,577,373 B2
(45) Date of Patent: Mar. 17, 2026

(54) CARBODIIMIDE COMPOSITION, CURING AGENT COMPOSITION, COATING COMPOSITION AND RESIN CURED PRODUCT

(71) Applicant: ASAHI KASEI KABUSHIKI KAISHA, Tokyo (JP)

(72) Inventors: Yusuke Ebe, Tokyo (JP); Hiroshi Inada, Tokyo (JP); Fukiko Tano, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 555 days.

(21) Appl. No.: 17/912,710

(22) PCT Filed: Mar. 26, 2021

(86) PCT No.: PCT/JP2021/012993

§ 371 (c)(1),
(2) Date: Sep. 19, 2022

(87) PCT Pub. No.: WO2021/193950

PCT Pub. Date: Sep. 30, 2021

(65) Prior Publication Data

US 2023/0135772 A1 May 4, 2023

(30) Foreign Application Priority Data

Mar. 27, 2020 (JP) ................................ 2020-057712

(51) Int. Cl.
*C08K 5/29* (2006.01)
*C09D 7/63* (2018.01)
*C09D 201/08* (2006.01)

(52) U.S. Cl.
CPC .................. *C08K 5/29* (2013.01); *C09D 7/63* (2018.01); *C09D 201/08* (2013.01)

(58) Field of Classification Search
CPC ........... C08K 5/29; C09D 7/63; C09D 201/08
USPC .......................................................... 524/606
See application file for complete search history.

(56) References Cited

U.S. PATENT DOCUMENTS

| | | | |
|---|---|---|---|
| 6,124,398 A | 9/2000 | Imashiro et al. | |
| 6,248,819 B1 | 6/2001 | Masuda et al. | |
| 2006/0089464 A1* | 4/2006 | Uwada ................ | C08G 18/797 525/452 |
| 2009/0137748 A1 | 5/2009 | Tanaka et al. | |
| 2009/0246393 A1 | 10/2009 | Ambrose et al. | |
| 2011/0021679 A1 | 1/2011 | Takahashi et al. | |
| 2017/0313037 A1 | 11/2017 | Min | |
| 2018/0066098 A1 | 3/2018 | Takahashi et al. | |
| 2018/0094095 A1* | 4/2018 | Takahashi .............. | C08G 18/76 |
| 2018/0371237 A1* | 12/2018 | Tsukamoto ........... | C08G 18/09 |
| 2019/0270837 A1 | 9/2019 | Sasaki | |
| 2021/0214541 A1 | 7/2021 | Enomoto | |
| 2021/0238141 A1 | 8/2021 | Miyake et al. | |
| 2022/0372202 A1 | 11/2022 | Sasaki et al. | |

FOREIGN PATENT DOCUMENTS

| | | |
|---|---|---|
| CN | 107531878 A | 1/2018 |
| EP | 3936578 A1 | 1/2022 |
| JP | S62-001714 A | 1/1987 |
| JP | H08-027270 A | 1/1996 |
| JP | H09-227851 A | 9/1997 |
| JP | H09-241353 A | 9/1997 |
| JP | H10-036469 A | 2/1998 |
| JP | H10-036668 A | 2/1998 |
| JP | H10-036767 A | 2/1998 |
| JP | 10-316930 A | 12/1998 |
| JP | 2000-313825 A | 11/2000 |
| JP | 2000-319351 A | 11/2000 |
| JP | 2001-011152 A | 1/2001 |
| JP | 2005-015734 A | 1/2005 |
| JP | 2006-070186 A | 3/2006 |
| JP | 2006-117844 A | 5/2006 |
| JP | 2007-138080 A | 6/2007 |
| JP | 2009-235278 A | 10/2009 |
| JP | 2013-112755 A | 6/2013 |
| JP | 2016-196612 A | 11/2016 |
| JP | 2016-196613 A | 11/2016 |
| JP | 6255114 B2 | 12/2017 |
| JP | 2018-009192 A | 1/2018 |
| JP | 2019-137757 A | 8/2019 |
| JP | 2019-210402 A | 12/2019 |
| WO | 2007/091427 A1 | 8/2007 |
| WO | 2017/006950 A1 | 1/2017 |
| WO | 2018/092752 A1 | 5/2018 |
| WO | 2019/004290 A1 | 1/2019 |
| WO | 2019/009022 A1 | 1/2019 |
| WO | 2019/221173 A1 | 11/2019 |

(Continued)

OTHER PUBLICATIONS

Written Opinion dated Jun. 15, 2021, issued in corresponding International Patent Application No. PCT/JP2021/012993.
Wada et al., "Structures and Strengths of Acid and Base in Non-Aqueous Solution", vol. 33, No. 11, pp. 809,814 (with partial translation).
Iwakura et al., Standard Applied Chemistry Lecture 10, Organic Synthetic Chemistry, Corona Publishing Co., Ltd, May 20, 1977, pp. 199, 204-213 (with partial translation).
Williams, American Chemical Society (ACS) Organic Division, 2022, pp. 1, 4-10.
Supplementary Search Report dated Sep. 28, 2023, issued in corresponding European Patent Application No. 21775683.2.

(Continued)

*Primary Examiner* — Kelechi C Egwim
(74) *Attorney, Agent, or Firm* — Morgan, Lewis & Bockius LLP

(57) ABSTRACT

The present invention provides a carbodiimide composition containing a water-soluble modified polycarbodiimide (A) and a water-insoluble polycarbodiimide (B), a curing agent composition using the same, a coating composition, and a resin cured product.

20 Claims, No Drawings

(56) References Cited

FOREIGN PATENT DOCUMENTS

| | | |
|---|---|---|
| WO | 2019/230047 A1 | 12/2019 |
| WO | 2021/059835 A1 | 4/2021 |

OTHER PUBLICATIONS

International Search Report dated Jun. 15, 2021, issued in corresponding International Patent Application No. PCT/JP2021/012993.

Kurzer et al., "Advances in the Chemistry of Carbodiimides", Chemical Reviews, vol. 67, No. 2, pp. 113, 118, 123, and 134 (1967).

* cited by examiner

CARBODIIMIDE COMPOSITION, CURING AGENT COMPOSITION, COATING COMPOSITION AND RESIN CURED PRODUCT

TECHNICAL FIELD

The present invention relates to a carbodiimide composition, a curing agent composition, a coating composition and a cured resin product.

BACKGROUND ART

In automobile manufacturing, the coating process is said to account for about ⅓ of the energy consumption, and from the viewpoint of the environment and reducing manufacturing costs, lowering the temperature of the coating film and reduction of the number of coating processes are being carried out. In particular, since the carboxylic acid (or carboxyl group) contained in the main agent lowers the water resistance of the coating film, it is required to consume the carboxylic acid at the time of baking the coating film. Further, it is required that a carboxylic acid consumption reaction occur in a low-temperature environment as the temperature of the baking of the coating film becomes lower. On the other hand, storage stability of the coating composition in a storage environment is also required. Carbodiimide compounds are attracting attention as candidate compounds that satisfy these conditions.

Patent Document 1 discloses a carbodiimide-based cross-linking agent in which terminal isocyanate groups are blocked with a hydrophilic group containing a polyethylene oxide repeating unit. Patent Document 1 describes that the carbodiimide-based cross-linking agent has excellent water solubility or water dispersibility. Further, Patent Document 2 discloses a carbodiimide-based aqueous resin cross-linking agent in which two specific types of polycarbodiimide are present in an aqueous medium at a specific ratio. Patent Document 2 describes that the carbodiimide-based aqueous resin cross-linking agent can cross-link the aqueous resin even when it is allowed to coexist with the aqueous resin for a long time.

On the other hand, in an attempt to improve the storage stability of the carbodiimide group, the carbodiimide is reacted with a reactive group capable of reacting with the carbodiimide to be converted into a functional group having a reduced reactivity with the carboxylic acid. For example, Patent Document 3 presents a resin cross-linking agent in which a carbodiimide group is modified with an amine. Further, Patent Document 4 presents a resin-curing agent having a uretonimine group obtained by modifying a carbodiimide group with an isocyanate group.

CITATION LIST

Patent Document

[Patent Document 1] Japanese Unexamined Patent Application, First Publication No. H10-316930

[Patent Document 2] Japanese Patent No. 6255114

[Patent Document 3] Japanese Unexamined Patent Application, First Publication No. 2013-112755

[Patent Document 4] PCT International Publication No. WO2019/221173

SUMMARY OF INVENTION

Technical Problem

However, the carbodiimide-based aqueous resin cross-linking agents described in Patent Documents 1 and 2 have a carbodiimide group that can react with the carboxylic acid in the aqueous resin. Therefore, thickening or gelation is observed during the long-term storage when mixed with an aqueous resin, and there is room for improvement in storage stability.

Further, although the modified carbodiimide-based aqueous resin cross-linking agents described in Patent Documents 3 and 4 have excellent storage stability, the reaction activity of the modified resin cross-linking agents after the modification is remarkably lowered at a low temperature of about 80° C., and the modifying agent is dissociated only at a high temperature of 100° C. or higher, and thus there is room for improvement in the low-temperature curability.

The present invention has been made in view of the above circumstances, and provides a carbodiimide composition having excellent storage stability and low-temperature curability when used as a coating composition, and a curing agent composition, a coating composition and a resin cured product using the carbodiimide composition.

Solution to Problem

That is, the present invention includes the following aspects.

(1) A carbodiimide composition comprising a water-soluble modified polycarbodiimide (A) and a water-insoluble polycarbodiimide (B).

(2) The carbodiimide composition according to (1), wherein a modification rate of the water-soluble modified polycarbodiimide (A) is 5% or more and 100% or less.

(3) The carbodiimide composition according to (1) or (2), wherein an average number of carbodiimide groups per molecule of the water-soluble modified polycarbodiimide (A) is in the range of 4.0 or less.

(4) The carbodiimide composition according to any one of (1) to (3), wherein a mass ratio (A)/(B) of the water-soluble modified polycarbodiimide (A) to the water-insoluble polycarbodiimide (B) is 90/10 or less.

(5) The carbodiimide composition according to any one of (1) to (4), wherein a modification rate of the water-insoluble polycarbodiimide (B) is 70% or less.

(6) The carbodiimide composition according to any one of (1) to (5), wherein the modification rate of the water-insoluble polycarbodiimide (B) is lower than the modification rate of the water-soluble modified polycarbodiimide (A).

(7) The carbodiimide composition according to any of (1) to (6), wherein an average number of carbodiimide groups per molecule of the water-insoluble polycarbodiimide (B) is larger than the average number of carbodiimide groups per molecule of the modified polycarbodiimide (A).

(8) The carbodiimide composition according to any one of (1) to (7), wherein an isocyanate of the water-soluble modified polycarbodiimide (A) is blocked with a polyalkylene glycol monoalkyl ether and/or an alkylene glycol monoalkyl ether.

(9) The carbodiimide composition according to any one of (1) to (8), wherein a molar ratio of the polyalkylene glycol monoalkyl ether and the alkylene glycol monoalkyl ether that block the isocyanate of the water-soluble modified polycarbodiimide (A) is 20/80 or more.

(10) The carbodiimide composition according to any one of (1) to (9), wherein the water-soluble modified polycarbodiimide (A) or a modifying agent of the water-insoluble polycarbodiimide (B) includes at least one selected from the group consisting of an isocyanate, a hydroxyl group-containing compound, a thiol group-containing compound, an acyclic amine, a cyclic amine, a carboxylic acid and a carboxylic acid derivative.

(11) The carbodiimide composition according to (10), wherein at least one electron-withdrawing functional group is contained in a skeleton of the modifying agent.

(12) The carbodiimide composition according to (10) or (11), wherein any one of a cyclic saturated hydrocarbon group having 1 or more and 12 or less carbon atoms, an acyclic saturated hydrocarbon group having 1 or more and 12 or less carbon atoms, an unsaturated hydrocarbon group having 2 or more and 8 or less carbon atoms, and a halogen atom is bonded in the skeleton of the modifying agent.

(13) The carbodiimide composition according to any one of (10) to (12), wherein any one of a hydroxyl group, an amino group, an ether group and a carbonyl group is bonded to the skeleton of the modifying agent.

(14) The carbodiimide composition according to any one of (10) to (13), wherein the water-soluble polycarbodiimide (A) or the modifying agent of the water-insoluble polycarbodiimide (B) contains at least one compound which is a hydroxyl group-containing compound and has a pKa of 7 or more and 16 or less in water.

(15) The carbodiimide composition according to any one of (1) to (14), wherein the water-soluble polycarbodiimide (A) or the modifying agent of the water-insoluble polycarbodiimide (B) contains at least one compound which is a carboxylic acid and has a pKa of 4.8 or less in water.

(16) A curing agent composition comprising the carbodiimide composition according to any one of (1) to (15) and water.

(17) The curing agent composition according to (16), further comprising a surfactant.

(18) A coating composition comprising the curing agent composition according to (16) or (17) and a compound having a carboxyl group.

(19) A cured resin product obtained by curing the coating composition according to (18).

Advantageous Effects of Invention

According to the carbodiimide composition of the above aspect, it is possible to provide a carbodiimide composition having excellent storage stability and low-temperature curability when made into a coating composition. The curing agent composition of the above aspect contains the carbodiimide composition, and has excellent storage stability and low-temperature curing property when made into a coating composition. The coating composition of the above aspect contains the curing agent composition and has excellent storage stability and low-temperature curing property. The cured resin product of the above aspect is obtained by curing the coating composition and has excellent water resistance (structure retention, whitening resistance) (hereinafter, may be simply referred to as “water resistance”).

DESCRIPTION OF EMBODIMENTS

Hereinafter, embodiments for carrying out the present invention (hereinafter referred to as “the present embodiment”) will be described in detail. The following embodiments are examples for explaining the present invention, although the present invention is not limited to the following embodiments. The present invention can be appropriately modified and carried out within the scope of the invention.

<<Carbodiimide Composition>>

The carbodiimide composition of the present embodiment contains a water-soluble modified polycarbodiimide (A) and a water-insoluble polycarbodiimide (B).

It is presumed that the carbodiimide composition of the present embodiment forms an association structure (aggregate) in which the water-soluble modified polycarbodiimide (A) covers the water-insoluble polycarbodiimide (B) in water. At this time, the carbodiimide group of the water-soluble modified polycarbodiimide (A) existing on the outside in the association structure is modified, so that the reactivity is low and the water-insoluble polycarbodiimide (B) having a high reactivity is present inside the associated structure. Therefore, even when stored as a coating composition mixed with a main ingredient, the carbodiimide group can be stored in a stable state without reacting with the reactive group capable of reacting with the carbodiimide group in the main ingredient. On the other hand, when the coating composition is cured at a low temperature of about 80° C., the association structure is broken by heating, so that the unmodified carbodiimide group having a high reactivity is exposed and reacts with the reactive group of the main ingredient. Further, by forming a sufficient crosslinked structure, the water resistance of the obtained coating film can be improved.

Water solubility in the water-soluble modified polycarbodiimide (A) means the property of dispersing in water without forming aggregates. On the other hand, the water-insoluble property of the water-insoluble polycarbodiimide (B) means the property of forming aggregates in water without dispersing by itself. By mixing the water-soluble modified polycarbodiimide (A) and the water-insoluble polycarbodiimide (B) at a specific mass ratio, an aggregate in which the water-soluble modified polycarbodiimide (A) covers the water-insoluble polycarbodiimide (B) can be formed.

As an index of water solubility and water insolubility, a solubility in 100 g of water can be used. The water-soluble substance in the present application represents a substance having a solubility of 10 g or more in 100 g of water, and the water-insoluble substance represents a substance having a solubility of less than 10 g in 100 g of water.

The water-soluble modified polycarbodiimide (A) preferably has a solubility of 10 g or more in 100 g of water, more preferably 30 g or more, even more preferably 40 g or more, and particularly preferably more than 40 g.

The water-insoluble polycarbodiimide (B) preferably has a solubility of less than 10 g in 100 g of water, more preferably less than 5 g, and even more preferably less than 1 g.

The solubility of the water-soluble modified polycarbodiimide (A) and the water-insoluble polycarbodiimide (B) in 100 g of water can be measured, for example, by the method shown in Examples described later.

In the carbodiimide composition of the present embodiment, the reactivity with the carboxylic acid (carboxyl group) derived from the main agent component can be adjusted by appropriately adjusting the modification rate of the water-soluble modified polycarbodiimide (A), and the storage stability of the coating composition can be further improved. Specifically, by increasing the modification rate of the water-soluble modified polycarbodiimide (A), it is possible to reduce the reactivity between the water-soluble modified polycarbodiimide (A) and the compound having a carboxyl group as the main ingredient. On the other hand, by lowering the modification rate, it is possible to increase the reactivity between the water-soluble modified polycarbodiimide (A) and the compound having a carboxyl group.

More specifically, the lower limit of the modification rate of the water-soluble modified polycarbodiimide (A) is preferably 5% or more, more preferably 50% or more, even more preferably 60% or more, and still even more preferably 70% or more. When the modification rate is within the above lower limit range, the storage stability of the coating composition can be further improved. On the other hand, the upper limit of the modification rate is preferably 100% or less, more preferably 95% or less, even more preferably 90% or less, and still even more preferably 85% or less, from the viewpoint of curing performance when used as a curing agent composition. Further, from the viewpoint of preventing the elution of unreacted water-soluble modified polycarbodiimide (A) from the curing agent composition, the modification rate is preferably not 100%, more preferably 95% or less, even more preferably 90% or less, still even more preferably 85% or less.

The modification rate of the water-soluble modified polycarbodiimide (A) represents the ratio of the functional groups converted into functional groups having reduced reactivity with carboxylic acid among the carbodiimide functional groups in the polycarbodiimide before modification, and can be calculated using the following method. Any method can be used for the measurement of the modification rate as long as it is an analytical method capable of quantifying the carbodiimide functional group, and for example, a spectroscopic method such as NMR or a method such as titration or elemental analysis or the like can be used.

First, for the water-soluble polycarbodiimide before and after modification, the integrated value of the absorption peak near the wavelength of 2150 $cm^{-1}$ derived from the carbodiimide group is obtained by infrared absorption spectrum measurement. Then, from the obtained integral value, the modification rate can be calculated based on the following formula. Specifically, it can be calculated by using the method shown in Examples described later.

Modification rate (%)=(Integral value of absorption peak near wavelength 2150 $cm^{-1}$ of water-soluble polycarbodiimide after modification)/(Integral value of absorption peak near wavelength 2150 $cm^{-1}$ of water-soluble polycarbodiimide before modification)×100

In the coating composition containing the carbodiimide composition of the present embodiment, the reactivity between the carbodiimide composition, which is a curing agent component, and the carboxylic acid (carboxyl group) derived from the main agent component can be adjusted by appropriately adjusting the mass ratio (A)/(B) of the water-soluble modified polycarbodiimide (A) to the water-insoluble polycarbodiimide (B) in the carbodiimide composition of the present embodiment, and good balance between storage stability and low-temperature curability when used as a coating composition can be maintained. Specifically, by increasing the mass ratio (A)/(B), that is, increasing the ratio of the water-soluble modified polycarbodiimide (A), since the reactivity with the compound having a carboxyl group, which is the main ingredient, is reduced in water, the storage stability can be further improved. On the other hand, by lowering the mass ratio (A)/(B), that is, increasing the ratio of the water-insoluble polycarbodiimide (B), since the reactivity with the compound having a carboxyl group, which is the main component, is further improved during heat curing, the low-temperature curability of the coating composition can be further improved. The low-temperature curability as a coating composition is further improved. More specifically, the upper limit of the mass ratio (A)/(B) of the water-soluble modified polycarbodiimide (A) to the water-insoluble polycarbodiimide (B) is preferably 90/10 or less, more preferably 80/20 or less, and even more preferably 70/30 or less. When the mass ratio (A)/(B) is not more than the above upper limit value, the low-temperature curability of the coating composition can be further improved. On the other hand, the lower limit is preferably 10/90 or more, more preferably 20/80 or more, and even more preferably 30/70 or more. When the mass ratio (A)/(B) is at least the above lower limit value, the storage stability of the coating composition can be further improved. In particular, from the viewpoint of the balance between storage stability and low-temperature curability when used as a coating composition, the mass ratio (A)/(B) is preferably 10/90 or more and 90/10 or less, more preferably 20/80 or more and 80/20 or less, and particularly preferably 30/70 or more and 70/30 or less. When the mass ratio (A)/(B) is in the above range, the balance between the storage stability and the low-temperature curability when the coating composition is obtained can be better maintained.

The mass ratio (A)/(B) can be calculated from, for example, the mass of the water-soluble modified polycarbodiimide (A) and the water-insoluble polycarbodiimide (B) contained in the carbodiimide composition.

Further, it is possible to adjust the crosslinked structure when reacting with the carboxylic acid (carboxyl group) derived from the main agent component by appropriately adjusting the difference between the average number of carbodiimide groups per molecule of the water-soluble modified polycarbodiimide (A) and the average number of carbodiimide groups per molecule of the water-insoluble polycarbodiimide (B) in the carbodiimide composition. From the viewpoints of storage stability and curability when made into a coating composition, as well as gel fraction, water resistance, and appearance when made into a resin cured product, it is preferable that the average number of carbodiimide groups per molecule of the water-insoluble polycarbodiimide (B) be larger than the average number of carbodiimide groups per molecule of the hydrophilic modified polycarbodiimide (A), more preferable that the average number of carbodiimide groups per molecule of the polycarbodiimide (B) be one or more larger than the average number of carbodiimide groups per molecule of the hydrophilic modified polycarbodiimide (A), even more preferable that the average number of carbodiimide groups per molecule of the polycarbodiimide (B) be 2 or more larger than the average number of carbodiimide groups per molecule of the hydrophilic modified polycarbodiimide (A), and particularly preferable that the average number of carbodiimide groups per molecule of the polycarbodiimide (B) be 3 or more larger than the average number of carbodiimide groups per molecule of the hydrophilic modified polycarbodiimide (A). By setting the average number of carbodiimide groups within the above range, it is possible to achieve both storage stability and curability when used as a coating composition, which have conventionally been in a trade-off relationship, and possible to obtain a resin cured product that has excellent gel fraction, water resistance, and appearance.

Next, details of each component constituting the carbodiimide composition of the present embodiment will be described below.

<Water-Soluble Modified Polycarbodiimide (A)>

Although the water-soluble modified polycarbodiimide (A) is not particularly limited and is similar to the generally known water-soluble modified polycarbodiimide, it is preferably a polycarbodiimide compound in which the terminal structures are composed of a hydrophilic group and at least some of the carbodiimide groups are modified by a modifying agent.

In the water-soluble modified polycarbodiimide (A), at least some of the carbodiimide groups are converted (modified) into functional groups having reduced reactivity with the carboxylic acid (carboxyl group) in the main agent component. Examples of the functional group having reduced reactivity with the carboxylic acid (carboxyl group) in the main agent component include a uretonimine group, an isourea group, a thioisourea group, a guanidine group, an N-acylurea group, a urea group, a thiourea group, a carboxyimideamide group and the like. Among the functional groups with reduced reactivity, a uretonimine group, an isourea group, a thioisourea group, guanidine group, and a carbodiimideamide group have an equilibrium with carbodiimide and can generate a carbodiimide group by heating and can improve the curability. In addition, the lower the temperature required for the formation of the carbodiimide group, the better the curability, which is preferable. From this viewpoint, a uretonimine group, an isourea group, and a guanidine group are preferable, a uretonimine group and an isourea group are more preferable, and a uretonimine group is particularly preferable.

When having these functional groups, it is possible to achieve excellent curability even when the mass ratio (A)/(B) of the modified polycarbodiimide (A) to the water-insoluble polycarbodiimide (B) is high. Further, even when the modification rate of the modified polycarbodiimide (A) is high, it is possible to achieve excellent curability.

On the other hand, among the functional groups with reduced reactivity, the N-acylurea group, the urea group, and the thiourea group have no equilibrium with carbodiimide or are negligibly small, so that it is highly effective in reducing the reactivity with carboxylic acid. Therefore, by having these functional groups, it is possible to realize excellent storage stability.

The polycarbodiimide, which is a raw material of the water-soluble modified polycarbodiimide (A), is derived by polycarbodiimidizing an isocyanate compound in the presence of a carbodiimidization catalyst.

Examples of the isocyanate compound include diisocyanate and polyisocyanate derived from the diisocyanate. In addition to the diisocyanate, the isocyanate compound may partially contain a divalent or higher valent isocyanate.

Examples of the diisocyanate include aliphatic diisocyanates, alicyclic diisocyanates, aromatic diisocyanates and the like.

Examples of the aliphatic diisocyanate include 1,4-tetramethylene diisocyanate, 1,5-pentamethylene diisocyanate, HDI, 2,2,4-trimethyl-1,6-hexamethylene diisocyanate, and lysine diisocyanate.

Examples of the alicyclic diisocyanate include IPDI, 4,4'-methylenebiscyclohexyldiisocyanate (hereinafter, may be abbreviated as "hydrogenated MDI"), and dimethylcyclohexanediisocyanate (hereinafter, may be abbreviated as "hydrogenated XDI").

Examples of the aromatic diisocyanate include 2,4-tolylene diisocyanate, 2,6-tolylene diisocyanate and its mixtures (hereinafter, may be abbreviated as "TDIs"), diphenylmethane-4,4'-diisocyanate (hereinafter, may be abbreviated as "MDI"), naphthalene-1,5-diisocyanate (hereinafter, may be abbreviated as "NDI"), 3,3-dimethyl-4,4-diphenylenediocyanate (hereinafter, may be abbreviated as "TODI"), crude TDIs, polymethylene polyphenyl diisocyanate, crude MDI, phenylene diisocyanate, xylylene diisocyanate (hereinafter, may be abbreviated as "XDI"), tetramethylxylylene diisocyanate (hereinafter, may be abbreviated as "TMXDI") and the like.

Among them, as the diisocyanate, 1,5-pentamethylene diisocyanate, HDI, alicyclic diisocyanate or aromatic diisocyanate is preferable, IPDI, hydrogenated MDI, MDI or TMXDI is more preferable, and IPDI or hydrogenated MDI is particularly preferable.

Examples of the polyisocyanate include those having at least one functional group selected from the group consisting of an isocyanurate group, an allophanate group, a biuret group, a uretdione group, an iminooxadiazinedione group and a urethane group. Of these, the polyisocyanate is preferably a polyisocyanate having an isocyanurate group.

The number-average molecular weight of the polycarbodiimide as a raw material of the water-soluble modified polycarbodiimide (A), that is, the polycarbodiimide before blocking isocyanate group terminals, is preferably 300 or more and 6000 or less, and more preferably 400 or more and 5000 or less, even more preferably 600 or more and 4000 or less. When the number-average molecular weight is within the above range, the dispersibility of the water-soluble modified polycarbodiimide (A) in water can be further improved, and when the carbodiimide composition of the present embodiment is used as a coating composition, the storage stability can be improved.

The number-average molecular weight of polycarbodiimide before blocking isocyanate group terminals can be measured, for example, by gel permeation chromatography (GPC) measurement. Specifically, it can be measured by the method shown in Examples described later.

At the terminals of the water-soluble modified polycarbodiimide (A), the bonding mode between the polycarbodiimide and the hydrophilic group is not particularly limited, and examples thereof include a urethane bond, a urea bond, a carbodiimide group, and an amide bond.

The hydrophilic group is not particularly limited as long as it is a functional group capable of imparting water solubility to polycarbodiimide, and examples thereof include an ethylene oxide group, a propylene oxide group, a hydroxyl group, a sulfonic acid group, a quaternary ammonium group, a phosphoric acid and the like. Of these, ethylene oxide or propylene oxide is preferable. These hydrophilic groups may be contained alone or in combination of two or more.

Further, as long as the water solubility of the water-soluble modified polycarbodiimide (A) is ensured, some of the terminal structures of the water-soluble modified polycarbodiimide (A) may be composed of a functional group other than the hydrophilic group. Above all, from the viewpoint of compatibility between the water-soluble modified polycarbodiimide (A) and the paint containing a carboxyl group, the terminal structures of the water-soluble modified polycarbodiimide (A) are preferably blocked with a polyalkylene glycol monoalkyl ether and/or an alkylene glycol monoalkyl ether, more preferably blocked with a polyalkylene glycol monoalkyl ether and an alkylene glycol monoalkyl ether. The molar ratio of the polyalkylene glycol monoalkyl ether and the alkylene glycol monoalkyl ether (polyalkylene glycol monoalkyl ether/alkylene glycol monoalkyl ether) is preferably 20/80 or more, more preferably 20/80 or more and less than 95/5, even more preferably 20/80 or more and less than 85/15, and particularly preferably 20/80 or more and less than 75/25. When the molar ratio is in the above range, the compatibility with the coating material containing a carboxyl group can be improved, and the water resistance and appearance of the cured resin can be improved, which is preferable.

Further, by appropriately adjusting the average number of carbodiimide groups per molecule of the water-soluble modified polycarbodiimide (A), the crosslinked structure when reacted with the carboxylic acid (carboxyl group) derived from the main agent component can be adjusted. From the viewpoint of storage stability when prepared as a coating composition, the average number of carbodiimide groups per molecule of the water-soluble modified polycarbodiimide (A) is preferably 4.0 or less, more preferably 3.0 or less, even more preferably 2.0 or less, and still even more preferably 1.0 or less. By setting the average number of carbodiimide groups in the above range, it is possible to reduce the molecular weight of the high-molecular-weight body generated by reacting with the main ingredient, and possible to suppress problems such as thickening of the coating composition caused by increasing the molecular weight, deterioration of water resistance of the cured resin, and poor appearance.

On the other hand, the lower limit of the average number of carbodiimide groups per molecule is not particularly limited and may be 0, but is preferably not 0, more preferably 0.5 or more, even more preferably 1.0 or more, still even more preferably 1.5 or more, and particularly preferably 2.0 or more. By setting the average number of carbodiimide groups in the above range, when made into a cured resin product, the water-soluble modified polycarbodiimide (A) chemically bonds with the carboxylic acid (carboxyl group) derived from the main ingredient, and the elution of water-soluble modified polycarbodiimide (A) from the cured resin product can be suppressed.

[Method for Synthesizing Water-Soluble Modified Polycarbodiimide (A)]

The water-soluble modified polycarbodiimide (A) can be obtained, for example, by a production method including the following steps. The order of step 2A and step 3A can be changed as appropriate according to the type of the modifying agent, but the steps 2A and 3A are generally performed in this order.

(1) A step of polycarbodiimidizing an isocyanate compound in the presence of a carbodiimidization catalyst to obtain polycarbodiimide (hereinafter, may be referred to as "step 1A");

(2) A step of blocking the terminal isocyanate groups of the polycarbodiimide obtained in step 1A with a compound having a hydrophilic group to obtain a hydrophilic group-terminated polycarbodiimide (hereinafter, may be referred to as "step 2A");

(3) A step of modifying at least some of the carbodiimide groups of the hydrophilic group-terminated polycarbodiimide obtained in step 2A with a modifying agent to obtain a water-soluble modified polycarbodiimide (A) (hereinafter referred to as "step 3A").

(Step 1A)

In step 1A, the isocyanate compound is subjected to a decarboxylation condensation reaction in the presence of a carbodiimideization catalyst to obtain polycarbodiimide.

Examples of the isocyanate compound used in the step 1A include the same as those exemplified in the above-mentioned "water-soluble modified polycarbodiimide (A)".

The reaction temperature can be, for example, 100° C. or higher and 250° C. or lower.

The reaction time is not particularly limited, but is preferably the time required for the number-average molecular weight of the polycarbodiimide to reach a degree of polymerization within the above range.

The decarboxylation condensation reaction can be carried out in the presence or absence of a solvent. The solvent is not particularly limited, and examples thereof include hydrocarbons, ethers, compounds having an amide bond, halogenated hydrocarbons, and the like. Examples of the hydrocarbon include benzene, toluene, xylene and the like. Examples of the ether include tetrahydrofuran (hereinafter, may be abbreviated as "THF"), diethyl ether and the like. Examples of the compound having an amide bond include N, N-dimethylformamide and the like. Examples of the halogenated hydrocarbon include methylene chloride, chlorobenzene and the like. As the solvent, one type may be used alone, two or more types may be used in combination, and when two or more types are used in combination, the combination and ratio thereof can be arbitrarily selected.

Examples of the carbodiimidization catalyst include phosphorene oxide and the like. Examples of the phosphorene oxide include 1-phenyl-2-phospholene-1-oxide, 3-methyl-1-phenyl-2-phospholene-1-oxide and the like.

In step 1A, after the reaction is completed, the polycarbodiimide may be isolated by performing post-treatment as necessary by a known method. That is, if necessary, post-treatment operations such as filtration, washing, extraction, pH adjustment, dehydration, and concentration are performed alone or in combination of two or more, and concentration, crystallization, reprecipitation, and column chromatography are performed. The polycarbodiimide may be isolated by such means. Further, the isolated polycarbodiimide may be further subjected to operations such as crystallization, reprecipitation, column chromatography, extraction, and stirring and washing of crystals with a solvent, as necessary. The operations may be carried out one or more times alone or in combination of two or more, so that the isolated polycarbodiimide is purified.

In step 1A, after the reaction is completed, although the polycarbodiimide may not be isolated and may be used in the next step, it is preferable to isolate the polycarbodiimide by the above-mentioned method from the viewpoint of improving the yield of the water-soluble modified polycarbodiimide (A), which is the target product.

(Step 2A)

In step 2A, the terminal isocyanate groups of the polycarbodiimide obtained in step 1A are blocked with a compound having a hydrophilic group to obtain a hydrophilic group-terminated polycarbodiimide.

Examples of the compound having a hydrophilic group include ethylene oxide, propylene oxide, and polymers or copolymers thereof; alcohols, sulfonates, quaternary amine salts, phosphates and the like.

Further, in step 2A, as long as the water solubility of the obtained water-soluble modified polycarbodiimide (A) is ensured, a compound having a hydrophilic group and a compound not having a hydrophilic group can be mixed and used.

The blending amount of the compound having a hydrophilic group can be appropriately adjusted according to the molar amount of the terminal isocyanate groups of the polycarbodiimide.

The reaction temperature can be, for example, 100° C. or higher and 250° C. or lower.

The reaction can be carried out in the presence or absence of a solvent. Examples of the solvent include the same solvents as those exemplified in the above step 1A.

In step 2A, after the reaction is completed, the hydrophilic group-terminated polycarbodiimide can be isolated by the same method as in the case of step 1A, and the isolated hydrophilic group-terminated polycarbodiimide may be further purified by the same method.

(Step 3A)

In step 3A, at least some of the carbodiimide groups of the hydrophilic group-terminated polycarbodiimide obtained in step 2A are modified with a modifying agent to obtain a water-soluble modified polycarbodiimide (A) in which at least some of the carbodiimide groups are converted into functional groups having reduced reactivity with the carboxylic acid (carboxyl group) contained in the main agent component. Examples of the functional group having reduced reactivity with the carboxylic acid (carboxyl group) contained in the main agent component include the same functional groups as those exemplified in the above-mentioned "water-soluble modified polycarbodiimide (A)".

The modifying agent may be a compound having a reactive group capable of reacting with a carbodiimide group, and examples thereof include isocyanates, alcohols, phenols, thiols, acyclic amines, cyclic amines, oximes, active methylenes, carboxylic acids, water and the like.

By having an electron-withdrawing functional group in the skeleton of the modifying agent, it is possible to adjust the reactivity between the polycarbodiimide and the denaturant. When isocyanates, hydroxyl group-containing compounds, thiol group-containing compounds, acyclic amines, cyclic amines, active methylenes, carboxylic acids, and/or carboxylic acid derivatives are used as a modifying agent, as the electron-withdrawing functional group, it is preferable to have any one or more of an unsaturated hydrocarbon group, a halogen group, and a carbonyl group, more preferable to have one or more of a halogen group and a carbonyl group, and particularly preferable to have one or more carbonyl groups. It is preferable because the reactivity with the carbodiimide is improved by binding to the electron-withdrawing functional group, and the modified polycarbodiimide with reduced side reaction products can be easily obtained.

In addition, by having a highly hydrophobic functional group in the skeleton of the denaturant, it is possible to adjust the hydrophobicity of the modified polycarbodiimide, and possible to adjust the water resistance and appearance of the cured resin. From this point of view, it is preferable to contain any one or more of a saturated hydrocarbon group, an unsaturated hydrocarbon group and a halogen group, more preferable to contain any one or more of a cyclic saturated hydrocarbon group having 1 to 12 carbon atoms, an acyclic saturated hydrocarbon group having 1 to 12 carbon atoms, an unsaturated hydrocarbon group having 2 to 8 carbon atoms, and a halogen atom, even more preferable to contain one or more halogen atoms, and particularly preferable to contain one or more fluorine atoms. By using the modifying agent having the functional group, water resistance and appearance of the cured resin can be improved.

Further, by having a functional group having a high compatibility with a compound having a carboxylic acid group in the skeleton of the modifying agent, it is possible to adjust the compatibility of the modified polycarbodiimide with the compound having a carboxylic acid (carboxyl group). Therefore, it is possible to adjust the water resistance and appearance of the cured resin product. From this point of view, it is preferable to contain any one or more of a hydroxyl group, an amino group, an ether group and a carbonyl group, more preferable to contain one or more of an ether group and a carbonyl group, and particularly preferable to contain one or more of a carbonyl group.

As the isocyanates, monovalent isocyanate compounds are preferable, and examples thereof include, isocyanates having a saturated hydrocarbon group such as an ethyl isocyanate, propyl isocyanate (each isomer), butyl isocyanate (each isomer), pentyl isocyanate (each isomer), hexyl isocyanate (each isomer), dodecyl isocyanate (each isomer), ethyl isocyanatoacetate (each isomer), butyl isocyanatoacetate (each isomer), cyclopentyl isocyanate (each isomer), cyclohexyl isocyanate or the like, isocyanates having an unsaturated hydrocarbon group such as a 2-isocyanatoethyl acrylate, 2-isocyanatoethyl methacrylate, phenyl isocyanate, benzyl isocyanate, phenyl isocyanate or the like, isocyanates having an ether group such as a methyl (S)-2-isocyanato-3-tert-butoxypropionate, (S)-ethyl-2-isocyanato-3-tert-butoxypropionate, (S)-propyl-2-isocyanato-3-tert-butoxypropionate (each isomer), (S)-butyl 2-isocyanato-3-tert-butoxypropionate (each isomer), (S)-2-isocyanato-3-tert-butoxypentylpropionate (each isomer), (S)-2-isocyanato-3-tert-butoxypropionate hexyl (each isomer), (S)-2-isocyanato-3-tert-butoxypropionate dodecyl (each isomer) or the like, isocyanates having a halogen group such as a 2-fluorophenyl isocyanate, 2-chlorophenyl isocyanate, 2-bromophenyl isocyanate, 2-iodophenyl isocyanate, 3-fluorophenyl isocyanate, 3-chlorophenyl isocyanate, 3-bromophenyl isocyanate, 3-iodophenyl isocyanate, 4-fluorophenyl isocyanate, 4-chlorophenyl isocyanate, 4-bromophenyl isocyanate, 4-iodophenyl isocyanate or the like, isocyanates having a carbonyl group such as a glycine methyl ester isocyanate (methyl isocyanatoacetate), glycine ethyl ester isocyanate (ethyl isocyanatoacetate), glycine propyl ester isocyanate, glycine butyl ester isocyanate (each isomer), glycine hexyl ester isocyanate (each isomer), glycine dodecyl ester isocyanate (each isomer), leucine methyl ester isocyanate (methyl 2-isocyanato-4-methyl pentanoate), leucine ethyl ester isocyanate (ethyl 2-isocyanato-4-methylpentanoate), leucine propyl ester isocyanate (each isomer), leucine pentyl ester isocyanate (each isomer), leucine hexyl ester isocyanate (each isomer), leucine dodecyl ester isocyanate (each isomer), ethyl isocyanatoacetate or the like, and the like.

As the alcohols, monohydric alcohol compounds (monoalcohols) are preferable, and examples thereof include alcohols having a saturated hydrocarbon group such as a methanol, ethanol, propanol (each isomer), butanol (each isomer), pentanol (each isomer), hexanol (each isomer), heptanol (each isomer), octanol (each isomer), nonanol (each isomer), decanol (each isomer), dodecanol (each isomer) or the like, alcohols having an unsaturated hydrocarbon group such as a 2-propene-1-ol, 2-butene-1-ol, 3-butene-1-ol, 2-penten-1-ol, 3-penten-1-ol, 4-penten-1-ol, 2-hexene-1-ol, 3-hexene-1-ol, 4-hexene-1-ol, 5-hexene-1-ol, benzyl alcohol or the like, alcohols having an ether group such as a 1-methoxy-2-propanol, 1-methoxyethanol, 1-ethoxyethanol, 1-propoxyethanol, 1-butoxyethanol, 1-pentoxyethanol, 1-hexoxyethanol, 1-methoxy-2-propanol, 1-ethoxy 2-propanol, 1-propoxy 2-propanol, 1-butoxy 2-propanol, 1-pentoxy 2-propanol, 1-butoxy 2-propanol or the like, alcohols having a halogen group such as a fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2-fluoroethanol, 2-chloroethanol, 2-bromoethanol, 2-iodoethanol, 2,2-difluoroethanol, 2,2-dichloroethanol, 2,2-dibromoethanol, 2,2-diiodoethanol, 2,2,2-trifluoroethanol, 2,2,2-trichloroethanol, 2,2,2-tribromoethanol, 2,2,2-triiodoethanol, 2,2,3,3,3-pentafluoropropanol, 2,2,3,3,3-pentachloropropanol, 2,2,3,3,3-pentabromopropanol, 2,2, 3,3,3-pentaiodopropanol, 2,2,2-trifluoro-1-trifluoromethylethanol, 2,2,2-trichloro-1-trichloromethylethanol, 2,2,2-tribromo-1-tribromomethylethanol, 2,2,2-triiodo-1-triiodomethylethanol, 1,1,1,3,3,3-hexafluoro-2-trifluoromethylpropanol, 1,1,1,3,3,3-hexachloro-2-trichloromethylpropanol, 1,1,1,3,3,3-hexabromo-2-tribromomethylpropanol, 1,1,1,3,3,3-hexaiodo-2-triiodomethylpropanol, 2,2,3,3,4,4,5,5-octafluoro-1-pentanol, 2,2,3,3,4,4,5,5-octachloro-1-pentanol, 2,2,3,3,4,4,5,5-octabromo-1-pentanol, 2,2,3,3,4,4,5,5-octaiodo-1-pentanol, hexafluoroisopropanol, hexachloroisopropanol, hexabromoisopropanol, exaiodoisopropanol, 2-fluorobenzyl alcohol, 2-chlorobenzyl alcohol, 2-bromobenzyl alcohol, 2-iodobenzyl alcohol, 3-fluorobenzyl alcohol, 3-chlorobenzyl alcohol, 3-bromobenzyl alcohol, 3-iodobenzyl alcohol, 4-fluorobenzyl alcohol, 4-chlorobenzyl alcohol, 4-bromobenzyl alcohol, 4-iodobenzyl alcohol or the like, alcohols having a carbonyl group such as hydroxy acid esters, a methyl glycolate, ethyl glycolate, propyl glycolate (each isomer), butyl glycolate (each isomer), pentyl glycolate (each isomer), hexyl glycolate (each isomer), dodecyl glycolate (each isomer), methyl lactate, ethyl lactate, propyl lactate (each isomer), butyl glycolate (each isomer), pentyl glycolate (each isomer), hexyl glycolate (each isomer), dodecyl glycolate (each isomer), methyl tartronate, ethyl tartronate, propyl tartronate (each isomer), butyl tartronate (each isomer), pentyl tartronate (each isomer), hexyl tartronate (each isomer), dodecyl tartronate (each isomer), methyl 2-hydroxybutyrate, ethyl 2-hydroxybutyrate, propyl 2-hydroxybutyrate (each isomer), butyl 2-hydroxybutyrate (each isomer), pentyl 2-hydroxybutyrate (each isomer), hexyl 2-hydroxybutyrate (each isomer), dodecyl 2-hydroxybutyrate (each isomer), methyl 3-hydroxybutyrate, ethyl 3-hydroxybutyrate, propyl 3-hydroxybutyrate (each isomer), butyl 3-hydroxybutyrate (each isomer), pentyl 3-hydroxybutyrate (each isomer), hexyl 3-hydroxybutyrate (each isomer), dodecyl 3-hydroxybutyrate (each isomer), methyl 4-hydroxybutyrate, ethyl 4-hydroxybutyrate, propyl 4-hydroxybutyrate (each isomer), butyl 4-hydroxybutyrate (each isomer), pentyl 4-hydroxybutyrate (each isomer), hexyl 4-hydroxybutyrate (each isomer), dodecyl 4-hydroxybutyrate (each isomer), dimethyl malate, diethyl malate, dipropyl malate (each isomer), dipentyl malate (each isomer), dihexyl malate (each isomer), didodecyl malate (each isomer), trimethyl citrate, triethyl citrate, tripropyl citrate (each isomer), tributyl citrate (each isomer), tripentyl citrate (each isomer), trihexyl citrate (each isomer), tridodecyl citrate (each isomer), trimethyl isocitrate, triethyl isocitrate, tripropyl isocitrate (each isomer), tripentyl isocitrate (each isomer), trihexyl isocitrate (each isomer), tridodecyl isocitrate (each isomer), hydroxy-2-propanone, hydroxy-2-butanone, hydroxy-2-pentanone, hydroxy-2-hexanone, hydroxy-3-butanone, hydroxy-3-pentanone, hydroxy-3-hexanone or the like, alcohols having an amino group such as 2-(dimethylamino)ethanol, 3-(dimethylamino)propanol, 4-(dimethylamino)pentanol, 5-(dimethylamino)hexanol or the like, phenols such as a phenol, methylphenol (each isomer), ethylphenol (each isomer), propylphenol (each isomer), butylphenol (each isomer) pentylphenol (each isomer), hexylphenol (each isomer), heptylphenol (each isomer), octylphenol (each isomer), nonylphenol (each isomer), dimethylphenol (each isomer), diethylphenol (each isomer), dipropylphenol (each isomer), dibutylphenol (each isomer), dipentylphenol (each isomer), trimethylphenol (each isomer), triethylphenol (each isomer), tripropylphenol (each isomer), tributylphenol (each isomer), methoxyphenol (each isomer), ethoxyphenol (each isomer), phenoxyphenol (each isomer), (phenylmethyl)phenol (each isomer), (phenylpropyl)phenol (each isomer), phenylphenol (each isomer), naphthol (each isomer) or the like, phenols having a halogen group such as a 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 3,4,5-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol, perfluoro-1-naphthol, perfluoro-2-naphthol, 2-chlorophenol, 3-chlorophenol, 4-chlorophenol, 2,4-dichlorophenol, 2,6-dichlorophenol, 3,4-dichlorophenol, 3,5-dichlorophenol, 2,4,6-trichlorophenol, 3,4,5-trichlorophenol, 2,3,5,6-tetrachlorophenol, pentachlorophenol, 2,3,5,6-tetrachloro-4-trichloromethylphenol, 2,3,5,6-tetrachloro-4-pentachlorophenylphenol, perchloro-1-naphthol, perchloro-2-naphthol, 2-bromophenol, 3-bromophenol, 4-bromophenol, 2,4-dibromophenol, 2,6-dibromophenol, 3,4-dibromophenol, 3,5-dibromophenol, 2,4,6-tribromophenol, 3,4,5-tribromophenol, 2,3,5,6-tetrabromophenol, pentabromophenol, 2,3,5,6-tetrabromo-4-tribromomethylphenol, 2,3,5,6-tetrabromo-4-pentabromophenylphenol, perbromo-1-naphthol, perbromo-2-naphthol, 2-iodophenol, 3-iodophenol, 4-iodophenol, 2,4-diiodophenol, 2,6-diiodophenol, 3,4-diiodophenol, 3,5-diiodophenol, 2,4,6-triiodophenol, 3,4,5-triiodophenol, 2,3,5,6-tetraiodophenol, pentaiodophenol, 2,3,5,6-tetraiodo-4-triiodomethylphenol, 2,3,5,6-tetraiodo-4-pentaiodophenylphenol, periodo-1-naphthol, periodo-2-naphthol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 3,4,5-tris(trifluoromethyl)phenol or the like, phenols having a carbonyl group such as a methyl salicylate, ethyl salicylate, propyl salicylate, butyl salicylate, pentyl salicylate, hexyl salicylate, dodecyl salicylate, 2-acetylphenol, 3-acetylphenol, 4-acetylphenol or the like, phenols having an amino group such as a 1-acetyl-4-(4-hydroxyphenyl)piperazine or the lie, and the like.

As the acyclic amines, secondary acyclic amines are preferable, and examples thereof include acyclic amines having a saturated hydrocarbon group such as a dimethylamine, diethylamine, dipropylamine, diisopropylamine, diisobutylamine, N-ethylmethylamine, N-ethylisopropylamine, N-ethylpropylamine, N-tert-butylethylamine or the like, acyclic amines having an unsaturated hydrocarbon group such as an N-methylbenzylamine, N-ethylbenzylamine, N-propylbenzylamine, N-butylbenzylamine or the like, acyclic amines having an ether group such as an N-(2-methoxyethyl)methylamine, N-(2-ethoxyethyl)methylamine, N-(2-propoxyethyl)methylamine, N-(2-butoxyethyl)methylamine, N-(2-pentoxyethyl)methylamine, N-(2-hexytoxyethyl)methylamine, N-(2-methoxyethyl)ethylamine, N-(2-ethoxyethyl)ethylamine, N-(2-propoxyethyl)ethylamine, N-(2-butoxyethyl)ethylamine, N-(2-pentoxyethyl)ethylamine, N-(2-hexytoxyethyl)ethylamine or the like, acyclic amines having a halogen group such as a bis(fluoromethyl)amine, bis(chloromethyl)amine, bis(bromomethyl)amine, bis(iodomethyl)amine, bis(difluoromethyl)amine, bis(dichloromethyl)amine, bis(dibromomethyeamine, bis(diiodomethyl)amine, bis(trifluoromethyl)amine, bis(trichloromethyl)amine, bis(tribromomethyeamine, bis(triiodomethyl)amine, bis(2,2,2-trifluoroethyl)amine, bis(2,2,2-trichloroethyl)amine, bis(2,2,2-tribromoethyl)amine, bis(2,2,2-triiodoethyl)amine, bis(2,2,3,3,3-pentafluoropropyl)amine, bis(2,2,3,3,3-pentachloropropyl)amine, bis(2,2,3,3,3-pentabromopropyl)amine, bis(2,2,3,3,3-pentaiodopropyl)amine, bis(2,2,2- trifluoro-1-trifluoromethylethyl)amine, bis(2,2,2-trichloro-1-trichloromethylethyl)amine, bis(2,2,2-tribromo-1-tribromomethylethyl)amine, bis(2,2,2-triiodo-1-triiodomethylethyl)amine, bis(1,1,1,3,3,3-hexafluoro trifluoromethylpropyl)amine, bis(1,1,1,3,3,3-hexachloro-2-trichloromethylpropyl)amine, bis(1,1,1,3,3,3-hexabromo-2-tribromomethylpropyl)amine, bis(1,1,1,3,3,3-hexaiodo triiodomethylpropyl)amine, bis(2-fluorophenyl)amine, bis(3-fluorophenyl)amine, bis(4-fluorophenyl)amine, bis(2-chlorophenyl)amine, bis(3-chlorophenyl)amine, bis(4-chlorophenyl)amine, bis(2-bromophenyl)amine, bis(3-bromophenyl)amine, bis(4-bromophenyl)amine, bis(2-iodophenyl)amine, bis(3-iodophenyl)amine, bis(4-iodophenyl)amine, bis(2,6-difluorophenyl)amine, bis(3,5-difluorophenyl)amine, bis(2,6-dichlorophenyl)amine, bis(3,5-dichlorophenyl)amine, bis(2,6-dibromophenyl)amine, di(3,5-dibromophenyl)amine, bis(2,6-diiodophenyl)amine, bis(3,5-diiodophenyl)amine, bis(2,4,6-trifluorophenyl) amine, bis(2,4,6-trichlorophenyl)amine, bis(2,4,6-tribromophenyl)amine, bis(2,4,6-triiodophenyl)amine, bis(pentafluorophenyl)amine, bis(pentachlorophenyl)amine, bis(pentabromophenyl)amine, bis(pentaiodophenyl)amine, bis(2-(trifluoromethyl)phenyl)amine, bis(3-(trifluoromethyl) phenyl)amine, bis(4-(trifluoromethyl)phenyl)amine, bis(2,6-di(trifluoromethyl)phenyl)amine, bis(3,5-di (trifluoromethyl)phenyl)amine, bis(2,4,6-tri (trifluoromethyl)phenyl)amine or the like, amines having a carbonyl group such as a dimethyliminodiacetate, diethyl iminodiacetate, dipropyl iminodiacetate, dibutyliminodiacetate, dipentyl iminodiacetate, dihexyliminodiacetate, N-methylglycine ethyl, N-ethylglycine ethyl or the like, acyclic amines having an amino group such as an N,N,N'-trimethylethylenediamine or the like, acyclic amines having a hydroxyl group such as a 2-(methylamino)ethanol, 2-(ethylamino)ethanol, 1-(methylamino)-2-propanol, 1-(ethylamino)-2-propanol or the like, and the like.

As the cyclic amines, secondary cyclic amines are preferable, and examples thereof include cyclic amines having a saturated hydrocarbon group such as a pyrrolidine, piperidine or the like, cyclic amines having an unsaturated hydrocarbon such as an imidazole, pyrazole, pyrrole, 1,2,4-triazole, 1,2,3-triazole, indole or the like, cyclic amines having an ether group such as a morpholine or the like, cyclic amines having a halogen group such as a 1-fluoropiperidine, 1-chloropiperidine, 1-bromopiperidine, 1-iodopiperidine, 2-fluoropiperidine, 2-chloropiperidine, 2-bromopiperidine, 2-iodopiperidine, 3-fluoropiperidine, 3-chloropiperidine, 3-bromopiperidine, 3-iodopiperidine, 4-fluoropiperidine, 4-chloropiperidine, 4-bromopiperidine, 4-iodopiperidine, 5-fluoroindole, 5-chloroindole, 5-bromoindole, 5-iodoindole or the like, cyclic amines having a carbonyl group such as a methyl 4-piperidinecarboxylate, ethyl 4-piperidinecarboxylate, propyl 4-piperidinecarboxylate (each isomer), butyl 4-piperidinecarboxylate (each isomer), pentyl 4-piperidinecarboxylate (each isomer), hexyl 4-piperidinecarboxylate (each isomer), dodecyl 4-piperidinecarboxylate (each isomer) or the like, cyclic amines having an amino group such as a 1-methylpiperazine, 1-ethylpiperazine, 1-propyl piperazine (each isomer), 1-butyl piperazine (each isomer), 1-pentylpiperazine (each isomer), 1-hexylpiperazine (each isomer), 1-dodecylpiperazine (each isomer) or the like, cyclic amines having a hydroxyl group such as a 3-hydroxypiperidine, 4-hydroxypiperidine or the like, and the like.

Examples of the oxime include oximes having a saturated hydrocarbon group, such as a formaldoxime, acetaldoxime, acetoxime, methyl ethyl ketoxime, 2-butanone oxime, cyclohexanone oxime or the like, oximes having an unsaturated hydrocarbon group such as an α-benzaldoxime or the like, oximes having a halogen group such as a 2-fluorobenzaldoxime, 2-chlorobenzaldoxime, 2-bromobenzaldoxime, 2-iodobenzaldoxime, 3-fluorobenzaldoxime, 3-chlorobenzaldoxime, 3-bromobenzaldoxime, 3-iodobenzaldoxime, 4-fluorobenzaldoxime, 4-chlorobenzaldoxime, 4-bromobenzaldoxime, 4-iodobenzaldoxime or the like, oximes having a carbonyl group such as a 1-phenyl-1,2-propanedione-2-oxime or the like, cyclic amines having a hydroxyl group such as a 1,3-dihydroxyacetone oxime or the like, and the like.

Further, examples of the compounds having a hydroxyl group include hydroxylamines such as a diethylhydroxylamine, hydroxysuccinimides such as an N-hydroxysuccinimide, hydroxyphthalimides such as an N-hydroxyphthalimide, and the like.

Examples of the thiols include thiols having a saturated hydrocarbon group such as a methanethiol, ethanethiol, propanethiol (each isomer), pentanethiol (each isomer), hexanethiol (each isomer), heptanethiol (each isomer), octanethiol (each isomer), nonanethiol (each isomer), decanethiol (each isomer), undecanethiol (each isomer), dodecanethiol (each isomer), cyclopentanethiol, cyclohexanethiol or the like, thiols having an unsaturated hydrocarbon group such as a 2-propene-1-thiol, benzyl mercaptan, thiophenol or the like, thiols having a halogen group such as a 3-fluoro-1-propanethiol, 3-chloro-1-propanethiol, 3-bromo-1-propanethiol, 3-iodo-1-propanethiol, 2-fluorothiophenol, 2-chlorothiophenol, 2-bromothiophenol, 2-iodothiophenol, 3-fluorothiophenol, 3-chlorothiophenol, 3-bromothiophenol, 3-iodothiophenol, 4-fluorothiophenol, 4-chlorothiophenol, 4-bromothiophenol, 4-iodothiophenol or the like, thiols having a carbonyl group such as a methyl thioglycolate, ethyl thioglycolate, propyl thioglycolate (each isomer), pentyl thioglycolate (each isomer), hexyl thioglycolate (each isomer), dodecyl thioglycolate (each isomer), methyl thiolactate, ethyl thiolactate, propyl thiolactate (each isomer), pentyl thiolactate (each isomer), hexyl thiolactate (each isomer), dodecyl thiolactate (each isomer) or the like, thiols having an amino group such as a 2-dimethylaminoethanethiol, 2-diethylaminoethanethiol, 2-dipropylaminoethanethiol, 2-dibutylaminoethanethiol, 2-dipentylaminoethanethiol, 2-dihexylaminoethanethiol, 2-didodecylaminoethanethiol or the like, thiols having a hydroxyl group such as a 2-mercaptoethanol, 3-mercapto-1-propanol, 4-mercapto-1-butanol, 5-mercapto-1-pentanol, 5-mercapto-1-hexanol, 5-mercapto-1-dodecanol or the like, and the like.

Examples of the active methylenes include active methylenes having a saturated hydrocarbon group such as a dimethyl malonate, diethyl malonate, dipropyl malonate (each isomer), dipentyl malonate (each isomer), dihexyl malonate (each isomer), didodecyl malonate (each isomer), methyl acetoacetate, ethyl acetoacetate, propyl acetoacetate (each isomer), pentyl acetoacetate (each isomer), hexyl acetoacetate (each isomer), dodecyl acetoacetate (each isomer), acetylacetone, isopropyl acetoacetate, di-sec-butyl malonate, di-tert-butyl malonate, di-tert-pentyl malonate, diisopropyl malonate, tert-butyl ethyl malonate, isopropyl ethyl malonate or the like, active methylenes having an unsaturated hydrocarbon group such as a dibenzyl malonate, benzyl acetoacetate or the like, active methylenes having an ether group such as a bis(2-methoxyethyl)malonate, 2-methoxyethyl acetoacetate or the like, active methylenes having a halogen group such as a methyl 4-fluoroacetoacetate, methyl 4-chloroacetoacetate, methyl 4-bromoacetoacetate, methyl 4-iodoacetoacetate, ethyl 4-fluoroacetoacetate, methyl 4-chloroacetoacetate, ethyl 4-bromoacetoacetate, ethyl 4-iodoacetoacetate, propyl 4-fluoroacetoacetate (each isomer), propyl 4-chloroacetoacetate (each isomer), propyl 4-bromoacetoacetate (each isomer), 4-propyl iodoacetoacetate (each isomer), butyl 4-fluoroacetoacetate (each isomer), butyl 4-chloroacetoacetate (each isomer), butyl 4-bromoacetoacetate (each isomer), butyl 4-iodoacetoacetate (each isomer), pentyl 4-fluoroacetoacetate (each isomer), pentyl 4-chloroacetoacetate (each isomer), pentyl 4-bromoacetoacetate (each isomer), pentyl 4-iodoacetoacetate (each isomer), hexyl 4-fluoroacetoacetate (each isomer), hexyl 4-chloroacetoacetate (each isomer), hexyl 4-bromoacetoacetate (each isomer), hexyl 4-iodoacetoacetate (each isomer), dodecyl 4-fluoroacetoacetate (each isomer), dodecyl 4-chloroacetoacetate, dodecyl 4-bromoacetoacetate, 4-dodecyl iodoacetoacetate, trifluoroacetylacetone, trichloroacetylacetone, tribromoacetylacetone, triiodoacetylacetone or the lie, and the like.

When the compound having a hydroxyl group is used as a modifying agent for the water-soluble polycarbodiimide (A) or the water-insoluble polycarbodiimide (B), the lower limit of pKa of the modifying agent in water is preferably 6, more preferably 7, even more preferably 8, and still even more preferably 9. On the other hand, the upper limit is preferably 16, more preferably 15, even more preferably 14, still even more preferably 13, and particularly preferably 12. When the pKa is at least the above lower limit, the urea that is formed by reaction of structures formed by the reaction of carbodiimide groups and hydroxyl-containing compounds with water can be reduced, thereby improving water resistance. On the other hand, when the pKa is not more than the upper limit, the reactivity between the carbodiimide group and the hydroxyl group-containing compound can be improved, and the polycarbodiimide can be modified under mild conditions. The pKa in water is not necessarily limited to the value measured in water, and a value measured in other solvent may be converted into pKa in water. Further, although it is known that pKa has temperature dependence, a value near room temperature is generally used. For example, it is generally known that the pKa of ethanol is 16 and the pKa of phenol is 10.

Examples of the carboxylic acids include carboxylic acids having a saturated hydrocarbon group such as an acetic acid, propionic acid, butyric acid, caproic acid, enanthic acid, caprylic acid, pivalic acid, valeric acid, isovaleric acid or the like, carboxylic acids having an unsaturated hydrocarbon group such as a benzoic acid, anisic acid, acrylic acid, methacrylic acid, crotonic acid, pentenoic acid, tiglic acid, 3-methylcrotonic acid, sorbic acid or the lie, carboxylic acids having an ether group such as a methoxyacetic acid, ethoxyacetic acid, propoxyacetic acid, butoxyacetic acid, pentoxyacetic acid, hexyloxyacetic acid, methoxy lactic acid, ethoxy lactic acid, propoxy lactic acid, butoxy lactic acid, pentoxy lactic acid, hexyloxylactic acid or the like, carboxylic acids having a halogen group such as a fluoroacetic acid, chloroacetic acid, bromoacetic acid, iodoacetic acid, difluoroacetic acid, dichloroacetic acid, dibromoacetic acid, diiodoacetic acid, trifluoroacetic acid, trichloroacetic acid, tribromoacetic acid, triiodoacetic acid, pentafluoropropionic acid, pentachloropropionic acid, pentabromopropionic acid, pentaiodopropionic acid, 2,2-bis(trifluoromethyl) propionic acid, 2,2-bis(trichloromethyl)propionic acid, 2,2-bis(tribromomethyl)propionic acid, 2,2-bis(triiodomethyl) propionic acid, 4,4,4-trifluorobutyric acid, 4,4,4-trichlorobutyric acid, 4,4,4-tribromobutyric acid, 4,4,4-triiodobutyric acid, heptafluorobutyric acid, heptachlorobutyric acid, heptabromobutyric acid, heptayodobutyric acid, 4,4,5,5,6,6,6-heptafluorohexanoic acid, 4,4,5,5,6,6,6-heptachlorohexanoic acid, 4,4,5,5,6,6,6-heptabromohexanoic acid, 4,4,5,5,6,6,6-heptayodohexanoic acid, 2-fluorobenzoic acid, 2-chlorobenzoic acid, 2-bromobenzoic acid, 2-iodobenzoic acid, 3-fluorobenzoic acid, 3-chlorobenzoic acid, 3-bromobenzoic acid, 3-iodobenzoic acid, 4-fluorobenzoic acid, 4-chlorobenzoic acid, 4-bromobenzoic acid, 4-iodobenzoic acid or the like, carboxylic acids having a carbonyl group such as a pyruvate, malonic acid, monomethyl malonate, monoethyl malonate, monopropyl malonate (each isomer), monobutyl malonate (each isomer), monopentyl malonate (each isomer), monohexyl malonate (each isomer), monododecyl malonate (each isomer), acetoacetic acid, monomethyl maleate, monoethyl maleate, monopropyl maleate (each isomer), monopentyl maleate (each isomer), monohexyl maleate (each isomer), monododecyl maleate (each isomer), monomethyl fumarate, monoethyl fumarate, monopropyl fumarate (each isomer), monopentyl fumarate (each isomer), monohexyl fumarate (each isomer), monododecyl fumarate (each isomer), monomethyl phthalate, monoethyl phthalate, monopropyl phthalate, monobutyl phthalate (each isomer), monopentyl phthalate (each isomer), monohexyl phthalate (each isomer), monododecyl phthalate (each isomer), monomethyl isophthalate, monoethyl isophthalate, monopropyl isophthalate (each isomer), monobutyl isophthalate (each isomer), monopentyl isophthalate (each isomer), monohexyl isophthalate (each isomer), monododecyl isophthalate (each isomer), monomethyl terephthalate, monoethyl terephthalate, monopropyl terephthalate (each isomer), monobutyl terephthalate (each isomer), monopentyl terephthalate (each isomer), monohexyl terephthalate (each isomer), monododecyl terephthalate (each isomer), carboxylic acids having a hydroxyl group such as hydroxy acids, a glycolic acid, lactic acid, tartronic acid, 2-hydroxybutyric acid, 3-hydroxybutyric acid, 4-hydroxybutyric acid, monomethyl malate, monoethyl malate, monopropyl malate (each isomer), monopentyl malate (each isomer), monohexyl malate (each isomer), monododecyl malate (each isomer), monomethyl citrate, monoethyl citrate, monopropyl citrate (each isomer), monopentyl citrate (each isomer), monohexyl citrate (each isomer), monododecyl citrate (each isomer), monomethyl isocitrate, monoethyl isocitrate, monopropyl isocitrate (each isomer), monopentyl isocitrate (each isomer), monohexyl isocitrate (each isomer), monododecyl isocitrate, etc. (each isomer), carboxylic acids having an amino group such as an N,N-dimethylglycine, N,N-diethylglycine, N,N-dipropylglycine, N,N-dibutylglycine, N,N-dipentylglycine, N,N-dihexylglycine, N,N-dimethylalanine, diethylalanine, N,N-dipropylalanine, N,N-dibutylalanine, N,N-dipentylalanine, N,N-dihexylalanine or the like, and the like.

When a carboxylic acid is used as a modifying agent for water-soluble polycarbodiimide (A) or water-insoluble polycarbodiimide (B), the upper limit of pKa of the modifying agent in water is preferably 4.8, more preferably 4.2, particularly preferably 3.7. By setting the pKa to the upper limit or less, the reaction of forming urea structure before the O-acylurea structure obtained by the reaction of the carbodiimide group and the carboxylic acid changes to N-acylurea structure can be suppressed, and the urea structure can be reduced, thereby improving the water resistance of the cured resin product to be obtained. As described above, the pKa in water is not necessarily limited to that measured in water, and a value measured in another solvent or the like may be converted into pKa in water. Further, although it is known that pKa has a temperature dependence, a value near room temperature is generally used. For example, it is generally known that acetic acid has a pKa of 4.8 and benzoic acid has a pKa of 4.2.

The blending amount of the modifying agent may be appropriately adjusted according to the molar amount of the carbodiimide group of the hydrophilic group-terminated polycarbodiimide so that the modification rate of the water-soluble modified polycarbodiimide (A) is within the above range.

The reaction temperature can be, for example, 20° C. or higher and 250° C. or lower, and 30° C. or higher and 80° C. or lower.

The reaction can be carried out in the presence or absence of a solvent. Examples of the solvent include the same solvents as those exemplified in the above step 1A.

In step 3A, after the reaction is completed, the water-soluble modified polycarbodiimide (A) can be isolated by the same method as in step 1A, and the isolated water-soluble modified polycarbodiimide (A) may be further purified by the same method.

The structures of the polycarbodiimide obtained in step 1A, hydrophilic group-terminated polycarbodiimide obtained in step 2A and the water-soluble modified polycarbodiimide (A) obtained in step 3A can be confirmed, for example, by nuclear magnetic resonance (NMR) spectroscopy, mass spectrometry (MS), infrared spectroscopy (IR), and other known methods.

<Water-Insoluble Polycarbodiimide (B)>

Although the water-insoluble polycarbodiimide (B) is not particularly limited and is similar to the generally known water-insoluble polycarbodiimide, it is preferably a polycarbodiimide compound having terminal structures having no hydrophilicity (hydrophobic group).

The polycarbodiimide, which is a raw material of the water-insoluble polycarbodiimide (B), is derived by polycarbodiimidizing an isocyanate compound in the presence of a carbodiimidization catalyst.

Examples of the isocyanate compound include those similar to those exemplified in the above-mentioned "water-soluble modified polycarbodiimide (A)". Among them, when the isocyanate compound is diisocyanate, 1,5-pentamethylene diisocyanate, HDI, alicyclic diisocyanate or aromatic diisocyanate is preferable, IPDI, hydrogenated MDI, MDI or TMXDI is more preferable, and IPDI or a hydrogenated MDI is particularly preferable.

When the isocyanate compound is a polyisocyanate, a polyisocyanate having at least one functional group selected from the group consisting of an isocyanurate group, a urethane group and an iminooxadiazinedione group is preferable.

The number-average molecular weight of the polycarbodiimide as the raw material of the water-insoluble polycarbodiimide (B), that is, the polycarbodiimide before the isocyanate group terminals are blocked, is preferably 300 or more and 6000 or less, more preferably 400 or more and 5000 or less, and even more preferably 600 or more and 4000 or less. When the number-average molecular weight is within the above range, the particle size of the aggregate (micelle) in which the water-insoluble polycarbodiimide (B) is covered with the water-soluble modified polycarbodiimide (A) becomes too large, resulting in aggregation and aggregation. Precipitation can be effectively prevented, and as a result, the water dispersibility of the aggregate can be further improved, and the storage stability when the carbodiimide composition of the present embodiment is used as a coating composition becomes better.

The number-average molecular weight of the polycarbodiimide before the isocyanate group terminals are blocked can be measured, for example, by GPC measurement. Specifically, it can be measured by using the method shown in Examples described later.

At the terminals of the water-insoluble polycarbodiimide (B), the bonding mode of a group having no hydrophilicity with the polycarbodiimide (sometimes referred to as a "hydrophobic group") is not particularly limited, and for example, a urethane bond, a urea bond, a carbodiimide group, amide bond and the like may be mentioned.

The group having no hydrophilicity (hydrophobic group) is not particularly limited as long as it is a functional group capable of imparting water solubility to polycarbodiimide, and for example, an ether bond, an ester bond, an amide bond, or a urethane bond. Examples thereof include an aliphatic alkyl group, an alicyclic alkyl group, an aliphatic alkenyl group, an alicyclic alkenyl group, and an aliphatic alkynyl group. Of these, an aliphatic alkyl group or an alicyclic alkyl group which may contain an ether bond is preferable. These non-hydrophilic groups (hydrophobic groups) may be present alone or in combination of two or more.

Further, as long as the water-insoluble property of the water-insoluble polycarbodiimide (B) is ensured, some of the terminal structures of the water-insoluble polycarbodiimide (B) may be composed of a hydrophilic group.

At least some of the carbodiimide groups of the water-insoluble polycarbodiimide (B) may or may not be modified. From the viewpoint of improving the compatibility with the water-soluble modified polycarbodiimide (A), it is preferable that at least some of the carbodiimide groups of the water-insoluble polycarbodiimide (B) be modified. By improving the compatibility between the water-soluble modified polycarbodiimide (A) and the water-insoluble polycarbodiimide (B), the dispersion stability in the curing agent composition is improved, and in addition, the resin cured product is obtained. At that time, the polycarbodiimide component is uniformly dispersed in the cured resin and reacts with the carboxylic acid, which contributes to the improvement of water resistance. Specifically, the lower limit of the modification rate of the water-insoluble polycarbodiimide (B) may be 0%, but is preferably not 0%, more preferably 1% or more, even more preferably 5% or more, and still even more preferably 10% or more. On the other hand, by reducing the modification rate of the polycarbodiimide (B), it is possible to improve the low-temperature curability of the coating composition and the water resistance of the coating film. From this point of view, the upper limit of the modification rate of the water-insoluble polycarbodiimide (B) is preferably 70% or less, more preferably 50% or less, even more preferably 35% or less, still even more preferably less than 5%, particularly preferably less than 1%, and most preferably 0%.

Further, it is possible to adjust the reactivity with the carboxylic acid (carboxyl group) derived from the main agent component by appropriately adjusting the difference between the modification rate of the water-insoluble polycarbodiimide (B) and the modification rate of the water-soluble modified polycarbodiimide (A) in the carbodiimide composition. From the viewpoints of storage stability and curability when made into a coating composition, as well as gel fraction, water resistance, and appearance when made into a resin cured product, the modification rate of the water-insoluble polycarbodiimide (B) is preferably lower than the modification rate of the water-soluble modified polycarbodiimide (A), more preferably 10% or more lower than the modification rate of the water-soluble modified polycarbodiimide (A), even more preferably 30% or more lower than the modification rate of the water-soluble modified polycarbodiimide (A), and particularly preferably 50% or more lower than the modification rate of the water-soluble modified polycarbodiimide (A). By setting the modification rate within the above range, it is possible to achieve both the storage stability of the paint composition and the curability, which have been in a trade-off relationship in the past, and the gel content of the cured resin product, and also possible to obtain a cured resin product having excellent gel fraction, water resistance, and appearance.

The modification rate of the water-insoluble polycarbodiimide (B) can be calculated by using the same method as the modification rate of the water-soluble modified polycarbodiimide (A).

[Method for Synthesizing Water-Insoluble Polycarbodiimide (B)]

The water-insoluble polycarbodiimide (B) can be obtained by a manufacturing method including, for example, a step (hereinafter, may be referred to as "step 1B") to obtain water-insoluble polycarbodiimide (B) (also referred to as hydrophobic group-terminated polycarbodiimide), in which an isocyanate compound is polycarbodiimidized in the presence of a carbodiimidization catalyst and the terminal isocyanate groups of the obtained polycarbodiimide are blocked with a compound having a hydrophobic group.

(Step 1B)

In step 1B, polycarbodiimide formation by a decarbonation condensation reaction in the presence of a carbodiimidization catalyst of an isocyanate compound and blocking with a compound having a hydrophobic group at the terminal isocyanate groups of the obtained polycarbodiimide are simultaneously performed, and a water-insoluble polycarbodiimide (B) is obtained.

In step 1B, although the step of polycarbodiimidizing an isocyanate compound in the presence of a carbodiimidization catalyst to obtain a polycarbodiimide (hereinafter, may be referred to as "step 1B-1") and the step of blocking the polycarbodiimide obtained in step 1B-1 with a compound having a hydrophobic group to obtain a water-insoluble polycarbodiimide (B) (hereinafter, may be referred to as "step 1B-2") may be carried out separately, from the viewpoint of manufacturing efficiency, it is preferable to perform the above steps 1B-1 and the above steps 1B-2 at the same time.

Examples of the isocyanate compound used in step 1B include the same as those exemplified in the above-mentioned "water-soluble modified polycarbodiimide (A)".

The compound having a hydrophobic group may contain, for example, an ether bond, an ester bond, an amide bond, or a urethane bond, such as an aliphatic alkane, an alicyclic alkane, an aliphatic alkene, an alicyclic alkene, an aliphatic alkyne and the like Further, in step 1B, as long as the water-insolubleness of the obtained water-insoluble polycarbodiimide (B) is ensured, the compound having a hydrophobic group and the compound having a hydrophilic group can be mixed and used.

The blending amount of the compound having a hydrophobic group can be appropriately adjusted according to the molar amount of the terminal isocyanate group of the polycarbodiimide produced during the reaction.

The reaction temperature can be, for example, 100° C. or higher and 200° C. or lower.

The reaction time is not particularly limited, but is preferably the time required for the number-average molecular weight of the polycarbodiimide to reach a degree of polymerization within the above range.

The decarboxylation condensation reaction can be carried out in the presence or absence of a solvent. Examples of the solvent include the same solvents as those exemplified in step 1A of the above-mentioned "Method for synthesizing water-soluble modified polycarbodiimide (A)".

Examples of the carbodiimideization catalyst include the same catalysts as those exemplified in step 1A of the above-mentioned "Method for synthesizing water-soluble modified polycarbodiimide (A)".

In step 1B, after the reaction is completed, the water-insoluble polycarbodiimide (B) can be isolated by the same method as in step 1A of the above-mentioned "Method for synthesizing water-soluble modified polycarbodiimide (A)". The removed water-insoluble polycarbodiimide (B) may be further purified by the same method.

In the production of the water-insoluble polycarbodiimide (B), a step of obtaining a water-insoluble modified polycarbodiimide (B') (hereinafter, may be referred to as "Step 2B") by modifying at least some of the carbodiimide groups of the hydrophobic group-terminated polycarbodiimide obtained in step 1B with a modifying agent.

In step 2B, at least some of the carbodiimide groups of the hydrophobic group-terminated polycarbodiimide obtained in step 1B are modified with a denaturing agent, and a water-insoluble modified polycarbodiimide (B') is obtained in which at least some of the carbodiimide groups are converted into functional groups having reduced reactivity with the carboxylic acid (carboxyl group) contained in the main agent component. Examples of the functional group having reduced reactivity with the carboxylic acid (carboxyl group) contained in the main agent component include the same functional groups as those exemplified in the above-mentioned "water-soluble modified polycarbodiimide (A)".

Examples of the modifying agent include the same as those exemplified in step 3A of the above-mentioned "Method for synthesizing water-soluble modified polycarbodiimide (A)".

The blending amount of the modifying agent is appropriately adjusted according to the molar amount of the carbodiimide group of the hydrophobic group-terminated polycarbodiimide so that the modification rate of the water-insoluble modified polycarbodiimide (B') is within the above range.

The reaction temperature may be, for example, 20° C. or higher and 100° C. or lower, and may also be 30° C. or higher and 80° C. or lower.

The reaction can be carried out in the presence or absence of a solvent. Examples of the solvent include the same solvents as those exemplified in step 1A of the above-mentioned "Method for synthesizing water-soluble modified polycarbodiimide (A)".

In step 2B, after the reaction is completed, the water-insoluble modified polycarbodiimide (B') can be isolated by the same method as in step 1A of the above-mentioned "Method for synthesizing water-soluble modified polycarbodiimide (A)". The removed water-insoluble modified polycarbodiimide (B') may be further purified by the same method.

The structures of the water-insoluble polycarbodiimide (B) (hydrophobic group-terminated polycarbodiimide) obtained in step 1B and the water-insoluble modified polycarbodiimide (B') obtained in step 2B can be determined, for example, by known methods such as nuclear magnetic resonance (NMR) spectroscopy, mass spectrometry (MS), infrared spectroscopy or the like.

<Method for Producing Carbodiimide Composition>

The carbodiimide composition of the present embodiment can be produced by mixing a water-soluble modified polycarbodiimide (A) and a water-insoluble polycarbodiimide (B), and if necessary, a solvent.

The solvent may be water or an organic solvent.

The organic solvent may be any one which does not have reactivity with the carbodiimide group, and examples thereof include hydrocarbons, ethers, compounds having an amide bond, ester bond or a urea bond, halogenated hydrocarbons and the like. Examples of the hydrocarbon include hexane, benzene, toluene, xylene and the like. Examples of the ether include THF, diethyl ether and the like. Examples of the compound having an amide bond include N, N-dimethylformamide and the like. Examples of the compound having an ester bond include ethyl acetate. Examples of the compound having a urea bond include 1,3-dimethylimidazolidinone. Examples of the halogenated hydrocarbon include methylene chloride, chlorobenzene and the like. Further, when stored at a low temperature, the organic solvent may be one having reactivity with the carbodiimide group, and may have active hydrogen.

The solvent may be used alone, or in combination of two or more thereof, and when two or more types are used in combination, the combination and ratio thereof can be arbitrarily selected.

<<Curing Agent>>

The carbodiimide composition has good water dispersibility and can be suitably used as an aqueous curing agent.

That is, in one embodiment, the present invention provides a curing agent containing the above carbodiimide composition and water.

<Surfactant>

The curing agent of the present embodiment preferably further contains a surfactant in order to improve the dispersion stability of the carbodiimide composition in water, namely the dispersion stability in water of the aggregate in the above carbodiimide composition, in which the water-soluble modified polycarbodiimide (A) covers the water-insoluble polycarbodiimide (B).

The surfactant is not particularly limited, and examples thereof include anionic surfactants, cationic surfactants, nonionic surfactants, betaine-based surfactants, and the like.

<Other Curing Agents>

The curing agent of the present embodiment may contain other curing agents (crosslinking agents) in addition to the above carbodiimide composition. Examples of other curing agents include oxazoline compounds, epoxy compounds, melamine compounds, isocyanate compounds, hydrazine compounds, semicarbazide compounds and the like.

Examples of the oxazoline compound include a polymer-like compound having at least two oxazoline groups in the side chain, a monomer compound having at least two oxazoline groups in one molecule, and the like. Examples of commercially available oxazoline compounds include Epocross WS-500 (manufactured by Nippon Shokubai, trade name).

The epoxy compound may be a resin having two or more epoxy groups in one molecule. Specific examples of the epoxy group-containing compound include a bisphenol-type epoxy group-containing compound obtained by adding epichlorohydrin to bisphenol, a novolak-type epoxy group-containing compound obtained by adding epichlorohydrin to a phenol novolak resin, polyethylene glycol diglycidyl ether and the like. The epoxy group-containing compound may be in a water-dispersed state, if necessary.

Examples of the melamine compound include a partially or completely methylolated melamine resin obtained by a reaction of melamine and an aldehyde, and the like.

Examples of the aldehyde include formaldehyde, paraformaldehyde and the like.

Further, the melamine compound may be one in which the methylol group of the methylolated melamine resin is partially or completely etherified with alcohol. Examples of the alcohol used for etherification include methanol, ethanol, n-propanol, isopropanol, n-butanol, isobutanol, 2-ethylbutanol, 2-ethylhexanol and the like.

Commercially available products of the melamine compound include, for example, Cymel 303, Cymel 323, Cymel 325, Cymel 327, Cymel 350, Cymel 370, Cymel 380, Cymel 385, Cymel 212, Cymel 251, Cymel 254, and Mycoat 776 (all are menufactured by Ornex, trade name) and the like.

The isocyanate compound is a diisocyanate or a polyisocyanate having an aliphatic, alicyclic or aromatic hydrocarbon group and an isocyanate group. Examples of the diisocyanate include tetramethylene diisocyanate (TMDI), pentamethylene diisocyanate (PD1), hexamethylene diisocyanate (HDI), 2,2,4-trimethylhexane-1,6-diisocyanate, 2-methylpentane-1,5-diisocyanate (MPDI), 1,3-bis (isocyanatomethyl)-cyclohexane (1,3-H6-XDI), 3 (4)-isocyanatomethyl-1-methyl-cyclohexylisoanate (IMCI), isophorone diisocyanate (IPDI), bis (isocyanatomethyl)-norbornane (NBDI), 1,3-bis (isocyanatomethyl)-benzene, 1,3-bis (2-isocyanatopropyl-2) benzene, 4,4'-dicyclohexylmethane diisocyanate (H12MDI), lysine diisocyanate (LDI) and the like. Of these, HDI or IPDI is preferable because of its weather resistance and easy industrial availability.

The polyisocyanate is a polymer of the diisocyanate obtained using a catalyst or by heating, and has an isocyanurate structure, a uretdione structure, an allophanate structure, an iminodioxadiazinedione structure, a urethane structure or a biuret structure in the molecule. Above all, from the viewpoint of weather resistance, the polyisocyanate preferably has an isocyanurate structure.

Other isocyanate compounds include 4-isocyanate methyl-1,8-octamethylene diisocyanate (NTI), 1,3,6-hexamethylene triisocyanate (HTI), bis (2-isocyanatoethyl) 2-isocyanatoglutarate (GTI), lysine triisocyanate (LTI) and the like.

Two or more of these isocyanate compounds may be used in combination.

Further, a blocked isocyanate compound obtained by blocking the isocyanate compound with one or more blocking agents selected from the group consisting of known active methylene-based blocking agents, known oxime-based blocking agents, known amine-based blocking agents, and known pyrazole-based blocking agents, can be used.

Among them, as said other curing agent, a melamine compound or a (blocked) isocyanate compound is preferable from the viewpoint of easy industrial availability, low-temperature curability, and storability as a coating composition.

<<Paint Composition>>

The curing agent can be used as a coating composition such as an electrodeposition coating material or the like by using it in combination with a compound having a carboxyl group as a main component.

That is, in one embodiment, the present invention provides a coating composition containing the above-mentioned curing agent and a compound having a carboxyl group.

The coating composition of the present embodiment has excellent storage stability and low-temperature curability by containing the above carbodiimide composition as a curing agent.

<Compound with Carboxyl Group>

Examples of the compound having a carboxyl group include a polyester having a carboxyl group, a polyamide having a carboxyl group, a polyurethane having a carboxyl group, an acrylic having a carboxyl group, and a polyolefin having a carboxyl group. Examples of the polyolefin constituting the polyolefin having a carboxyl group include a polypropylene, a polyethylene, a polypropylene-polyethylene (random block) copolymer, and other polyolefins having 4 or more carbon atoms in the repeating unit.

These compounds having a carboxyl group may be used alone or in combination of two or more.

Further, in the coating composition of the present embodiment, the compound having a carboxyl group may be used in the form of a main agent mixed with other components.

In the coating composition of the present embodiment, the lower limit of molar equivalent ratio (carbodiimide group/carboxyl group) of the carbodiimide group to the carboxyl group of the compound having a carboxyl group in the carbodiimide composition is, for example, 0.1, preferably 0.2, and more preferably 0.5. On the other hand, the upper limit of the carbodiimide group/carboxyl group is, for example, 5.0, preferably 2.0, and more preferably 1.5.

That is, the carbodiimide group/carboxyl group is 0.1 or more and 5.0 or less, preferably 0.2 or more and 2.0 or less, and more preferably 0.5 or more and 1.5 or less.

When the carbodiimide group/carboxyl group is within the above range, the obtained cured resin product tends to have better water resistance and a higher crosslink density.

<Additives>

The coating composition of the present embodiment may further contain additives, such as an epoxy resin, a catalyst, a coating improver, a leveling agent, an antifoaming agent, a stabilizer such as an antioxidant or an ultraviolet absorber, a plasticizer, a surfactant, a pigment, a filler, organic or inorganic fine particles, an antifungal agent, a silane coupling agent or the like, if necessary. The blending amount of these additives can be appropriately determined depending on the purpose and use thereof.

<<Cure Resin Product>>

By curing the above coating composition, a cured resin product can be obtained.

That is, in one embodiment, the present invention provides a cured resin product obtained by curing the above coating composition. The cured resin product of the present embodiment has good water resistance.

The method for producing the cured resin is not particularly limited, and if the coating composition is a one-component type, examples thereof include a method in which the coating composition is directly applied to an object to be coated or adhered. Further, if the coating composition is a two-component type, examples thereof include a method in which the curing agent and the compound having a carboxyl group, and if necessary, an additive or the like are mixed, and the obtained coating composition is applied to an object to be coated or adhered. After that, the coating composition applied to the object to be coated or adhered is heat-cured to obtain a cured resin product. Further, the chemical structure of the polycarbodiimide in the obtained cured resin can be analyzed by various analytical methods. When the curing agent according to the present invention is present in the cured resin product in a state of being reacted or unreacted with a carboxylic acid, the functional group, the functional group ratio and the like can be determined by measurements such as solid-state NMR measurement, LC analysis, GC analysis, IR measurement, Raman measurement, XPS measurement. Further, when a functional group in an equilibrium state with the carbodiimide contained in the curing agent of the present invention remains in the cured resin product, the structure can be determined by a method for analyzing a pyrolysis product such as pyrolysis GC-MS.

The upper limit of the curing temperature of the coating composition is, for example, 140° C., preferably 100° C., more preferably 80° C. On the other hand, the lower limit of the curing temperature is, for example, 20° C., preferably 30° C., more preferably 40° C.

That is, the curing temperature of the coating composition is 20° C. or higher and 140° C. or lower, preferably 30° C. or higher and 100° C. or lower, and more preferably 40° C. or higher and 80° C. or lower.

Examples of the coating method of the coating composition include roll coating, curtain flow coating, spray coating, bell coating, electrostatic coating and the like.

EXAMPLE

Hereinafter, the present invention will be described in more detail with reference to specific examples, but the present invention is not limited to the following examples as long as the scope of the present invention is not exceeded.

<Measurement Method of Physical Properties>

[Physical Property 1]

(Number-Average Molecular Weight)

The number-average molecular weight of the polycarbodiimide (isocyanate-terminated polycarbodiimide) before blocking the terminal isocyanate groups was determined by GPC measurement under the measurement conditions shown below as a polystyrene-based molecular weight. In addition, polystyrene having a molecular weight of 300 or more and 40,000 or less was used for preparing the calibration curve.

(Measurement Condition)

Device: HLC-8320GPC (TOSOH)
Column: TSKgelSuperH3000×1 (TOSOH)
TSKgelSuperH2000×1 (TOSOH)
TSKgelSuperH1000×1 (TOSOH)
Carrier: Tetrahydrofuran
Flow rate: 0.6 mL/min
Sample concentration: 1.0% by mass
Injection volume: 20 μL
Temperature: 40° C.
Detection method: Differential refractometer Further, in the water-insoluble polycarbodiimide, for the samples synthesized by simultaneously performing the blocking reaction of the terminal isocyanate group and the polycarbodiimidization reaction, the number-average molecular weight of the polycarbodiimide before blocking the isocyanate group terminals was calculated by measuring the number-average molecular weight after blocking the terminals by GPC and subtracting the blocking structures from the obtained number-average molecular weight. In the case where the terminals are blocked with a monoisocyanate, since carbon dioxide is desorbed during the structure before blocking is converted to the structure after blocking, the contribution was included in the calculation. On the other hand, in the case where the terminal is blocked with alcohol such as PGME, because carbon dioxide does not desorb during the structures before blocking are converted to the structures after blocking, the contribution was not considered in the calculation.

Specifically, it was calculated using the following formula.

(1) Terminals Blocked with Cyclohexyl Isocyanate (Number-average molecular weight of polycarbodiimide (PCI) before blocking terminals)=(Number-average molecular weight of polycarbodiimide obtained by GPC after blocking terminals)−2×(Cyclohexyl isocyanate molecular weight: 125 g/mol)+2×(molecular weight of carbon dioxide: 44 g/mol)

(2) Terminals Blocked with Propylene Glycol Monomethyl Ether (PGME)

(Number-average molecular weight of polycarbodiimide (PCI) before blocking isocyanate group terminals)=(Number-average molecular weight of polycarbodiimide obtained by GPC after blocking terminals)−2×(PGME molecular weight: 90 g/mol)

[Physical Property 2]
(Modification Rate)

For the water-soluble modified polycarbodiimides obtained immediately after adding the modifying agent to the hydrophilic group-terminated polycarbodiimide obtained in step 2A of "Synthesis of water-soluble modified polycarbodiimide" described later (namely, hydrophilic group-terminated polycarbodiimide before modification (water-soluble polycarbodiimide before modification)) and obtained in step 3A of "Synthesis of water-soluble modified polycarbodiimide", the integrated value of the absorption peak near the wavelength of 2150 $cm^{-1}$ derived from the carbodiimide group was obtained by infrared absorption spectrum measurement, and the modification rate was calculated based on the following formula.

Modification rate (%)=(integrated value of absorption peak near wavelength 2150 $cm^{-1}$ of water-soluble modified polycarbodiimide)/(integrated value of absorption peak near wavelength 2150 cm−1 of hydrophilic group-terminated polycarbodiimide)×100

[Physical Property 3]
(Solubility in 100 g of Water)

Each water-soluble modified polycarbodiimide or each water-insoluble polycarbodiimide was added in an amount of 1 g to 41 g to a glass stirring tank having an internal volume of 300 mL to which a mechanical stirrer was connected. Then, 100 g of water was added, and the mixture was stirred at 40° C. for 48 hours, and then the presence or absence of precipitation in the mixture was visually confirmed. In each water-soluble modified polycarbodiimide or each water-insoluble polycarbodiimide, the boundary between the mass when precipitation was observed and the mass when no precipitation was observed was determined with an accuracy of 1 g, and the maximum mass when no precipitation was observed was defined as the solubility in 100 g of water. It was found that the solubility in 100 g of water of each water-soluble modified polycarbodiimide calculated by this method was 10 g or more. On the other hand, it was found that the solubility in 100 g of water of each water-insoluble polycarbodiimide was less than 1 g.

[Physical Characteristics 4]
(Average Number of Carbodiimide Functional Groups Per Molecule)

The average number of carbodiimide functional groups per molecule of polycarbodiimide can be calculated as follows. The carbodiimide group content (NCN %) is defined from the integrated value of the absorption peak around 2150 $cm^{-1}$ derived from the carbodiimide group by the infrared absorption (IR) spectrum measurement, then the NCN equivalent (g/mol) (chemical formula weight per 1 mol of carbodiimide group) is determined, and then the average number of carbodiimide functional groups per molecule of polycarbodiimide is determined based on the following formula using the NCN equivalent and the number-average molecular weight (g/mol) determined by GPC.

Average number of carbodiimide functional groups per molecule=Number-average molecular weight (g/mol)/NCN equivalent (g/mol)

<Evaluation Method>

[Evaluation 1]
(Storage Stability)

The storage stability of the coating compositions prepared by mixing the carbodiimide compositions obtained in the Examples and Comparative Examples with a main agent was evaluated by measuring the change in viscosity.

Specifically, first, 36 g of each carbodiimide composition adjusted to a solid content of 10% by mass was added to 80 g of an acrylic polyol-based main agent SETAQUA6510, and then stirred to obtain a uniform solution (coating composition). This uniform solution (coating composition) was heated at 40° C. for 10 days, and the viscosities before and after heating were measured. Next, the storage stability was evaluated from the obtained viscosity increase rate according to the following evaluation criteria, with the percentage of the value obtained by dividing the viscosity after heating by the viscosity before heating as the viscosity increase rate.

(Evaluation criteria)

○: Viscosity increase rate was less than 120%

Δ: Viscosity increase rate was 120% or more and less than 140% x: Viscosity increase rate was 140% or more

[Evaluation 2]
(Low-Temperature Curability)

The low-temperature curability of the coating compositions prepared by mixing the carbodiimide compositions obtained in the Examples and Comparative Examples with a main agent was evaluated by measuring the gel fraction increase rate.

Specifically, first, 8 g of ion-exchanged water was added to 49 g of a polyurethane aqueous dispersion (manufactured by Dai-ichi Kogyo Seiyaku Co., Ltd., Superflex 150), and then the mixture was stirred to obtain a uniform solution. This uniform solution was applied onto a polystyrene plate (hereinafter, may be abbreviated as "PS plate") and baked in a dryer at 80° C. for 30 minutes to cure. Then, the coating film was cut out from the PS plate, placed in a plain weave wire mesh, immersed in an acetone solution for 20 hours, and then the coating film was taken out together with the plain weave wire mesh and dried in a dryer. Then, the mass change of the coating film before and after immersion in the acetone solution was measured, and the percentage of the value obtained by dividing the mass change of the coating film by the mass of the coating film before immersion was used as the reference gel fraction.

Next, 8 g of each carbodiimide composition adjusted to a solid content of 10% by mass was added to 49 g of a polyurethane aqueous dispersion (manufactured by Dai-ichi Kogyo Seiyaku Co., Ltd., Superflex 150), and then stirred to obtain a uniform solution (coating composition). This uniform solution (coating composition) was applied onto a PS plate in the same manner as described above and cured, and then the gel fraction was measured in the same manner as described above. Then, the value obtained by subtracting the reference gel fraction from the obtained gel fraction was obtained as the gel fraction increase rate. Then, from the obtained gel fraction increase rate, the low-temperature curability was evaluated according to the following evaluation criteria.

(Evaluation criteria)

○: Gel fraction increase rate was 2% by mass or more

Δ: Gel fraction increase rate was 0% by mass or more and less than 2% by mass x: Gel fraction increase rate was less than 0% by mass

[Evaluation 3]

(Water Resistance-Structure Retention)

The water resistance of the coating film using the carbodiimide compositions obtained in Examples and Comparative Examples was carried out by the method shown below.

Specifically, first, 8 g of ion-exchanged water was added to 49 g of a polyurethane aqueous dispersion (manufactured by Dai-ichi Kogyo Seiyaku Co., Ltd., Superflex 150), and then the mixture was stirred to obtain a uniform solution (coating composition). This uniform solution (coating composition) was applied onto a PS plate and cured in a dryer at 80° C. for 30 minutes. After that, an O ring (inner diameter: 1.78 mm, wire diameter: 1.78 mm) was placed on the coating film, 1 mL of ion-exchanged water was dropped into the O ring, and covered with a polyvinylidene chloride film to prevent the water from volatilizing. Then, it was allowed to stand at room temperature for 144 hours, and the form of the coating film was visually confirmed and used as a reference.

Next, 8 g of each carbodiimide composition adjusted to a solid content of 40% by mass was added to 49 g of a polyurethane aqueous dispersion (manufactured by Dai-ichi Kogyo Seiyaku Co., Ltd., Superflex 150), and then stirred to obtain a uniform solution (coating composition). This uniform solution (coating composition) was applied onto a PS plate in the same manner as described above and cured, and then the form of the coating film was visually confirmed in the same manner as described above and compared with the reference. Then, from the comparison results, the water resistance (structure retention) of the coating film was evaluated according to the following evaluation criteria.

(Evaluation criteria)

○: The state of the film was maintained (not damaged at all compared with the reference coating film)

Δ: A part of the film was slightly destroyed (the degree of damage was less than that of the reference coating film).

x: The film was destroyed (the degree of damage was the same extent as or more than the reference coating film).

[Evaluation 4]

(Water Resistance-Whitening Resistance)

The water resistance of the coating films using the carbodiimide compositions obtained in the Examples and the Comparative Examples was evaluated by the method shown below.

Specifically, first, 8 g of ion-exchanged water was added to 49 g of a polyurethane aqueous dispersion (manufactured by Dai-ichi Kogyo Seiyaku Co., Ltd., Superflex 150), and then the mixture was stirred to obtain a uniform solution (coating composition). This uniform solution (coating composition) was applied onto a PS plate and cured in a dryer at 80° C. for 30 minutes. After that, an O ring (inner diameter: 1.78 mm, wire diameter: 1.78 mm) was placed on the coating film, 1 mL of ion-exchanged water was dropped into the O ring, and a polyvinylidene chloride film was covered to prevent water volatilization. Then, it was allowed to stand at room temperature for 144 hours, and the degree of whitening of the coating film was visually confirmed and used as a reference.

Next, 8 g of each carbodiimide composition adjusted to a solid content of 40% by mass was added to 49 g of a polyurethane aqueous dispersion (manufactured by Dai-ichi Kogyo Seiyaku Co., Ltd., Superflex 150), and then stirred to obtain a uniform solution (coating composition). This uniform solution (coating composition) was applied onto a PS plate in the same manner as described above and cured, and then the degree of whitening of the coating film was visually confirmed using the same method as described above and compared with the reference. In addition, after wiping off the ion-exchanged water and allowing it to stand in a room temperature environment, the degree of whitening was visually confirmed again. Then, from the comparison results, the water resistance (whitening resistance) of the coating film was evaluated according to the following evaluation criteria.

(Evaluation criteria)

◎: No whitening was observed.

○: Slight whitening was observed, but no whitening was observed 1 hour after wiping off the ion-exchanged water.

Δ: Whitening was clearly observed, but no whitening was observed 24 hours after wiping off the ion-exchanged water.

x: Whitening was clearly observed, and whitening was observed even 24 hours after wiping off the ion-exchanged water.

Synthesis of Carbodiimide Compounds

Synthesis Example 1

(Synthesis of Water-Soluble Modified Polycarbodiimide A-1)

(1) Step 1A: Synthesis of Isocyanate-Terminated Polycarbodiimide

In a stirring tank made of SUS316 having an internal volume of 1 L, 100 g of dicyclohexylmethane-4,4'-diisocyanate and 0.5 g of 3-methyl-1-phenyl-2-phospholene-1-oxide (carbodiimidization catalyst) were placed, and the resulting mixture was reacted at 190° C. for 20 hours under a nitrogen atmosphere to obtain an isocyanate-terminated polycarbodiimide. After the reaction, the isocyanate group content (NCO %) was measured from the integrated value of the absorption peak around 2250 cm' derived from the isocyanate group in the infrared absorption (IR) spectrum measurement, and as a result, the isocyanate group content was 5.7% by mass (polymerization degree of 5.6), and the number-average molecular weight of the obtained isocyanate-terminated polycarbodiimide was 1,485 g/mol.

(2) Step 2A: Synthesis of Hydrophilic Group-Terminated Polycarbodiimide 64 g of polyethylene glycol monomethyl ether (number-average molecular weight: 550) as a compound having a hydrophilic group (hereinafter, may be referred to as "hydrophilic group-containing compound") was added to the isocyanate-terminated polycarbodiimide obtained in the above step 1A and the resulting mixture was reacted at 160° C. for 48 hours under a nitrogen atmosphere to obtain a hydrophilic group-terminated polycarbodiimide. After the reaction, the disappearance of the absorption peak around 2250 $cm^{-1}$ derived from the isocyanate group was confirmed by infrared absorption (IR) spectrum measurement.

(3) Step 3A: Synthesis of Water-Soluble Modified Polycarbodiimide A-1

33 g of 2,2,2-trifluoroethanol (TFE) as a modifying agent was added to the hydrophilic group-terminated polycarbodiimide obtained in the above step 2A, and the resulting mixture was reacted at 40° C. for 72 hours under a nitrogen atmosphere to obtain a water-soluble modified polycarbodiimide A-1. After the reaction, the disappearance of the absorption peak around the wavelength of 2150 $cm^{-1}$ derived from the carbodiimide group was confirmed by infrared absorption (IR) spectrum measurement. Therefore, the NCN % was 0%, and the average number of carbodiimide functional groups per molecule was determined to be 0.0.

Synthesis Examples 2 to 144

(Synthesis of Water-Soluble Modified Polycarbodiimides A-2 to A-144)

Each water-soluble modified polycarbodiimide was obtained in the same manner as in Synthesis Example 1, except that the number-average molecular weight of the isocyanate-terminated polycarbodiimide (polycarbodiimide before blocking isocyanate group terminals) and the modification rate of the obtained water-soluble modified polycarbodiimide were set to the values shown in Tables 1 to 5 using the diisocyanates, the compounds from which the terminal structures were derived, and the modifying agents shown in Tables 1 to 5. When two kinds of compounds from which the terminal structures were derived were used, the blending ratio was set to the molar ratio shown in Tables 1 to 5. In Tables 1-5, each abbreviation means the following compounds.

(Diisocyanate)
- hMDI: Dicyclohexylmethane-4,4'-diisocyanate
- IPDI: Isophorone diisocyanate
- HDI: Hexamethylene diisocyanate
- TDI: Toluene diisocyanate
- TMXDI: 1,3-Bis (2-isocyanato-2-propyl) benzene (Compound from which the terminal structures are derived)
- MPEG400: Polyethylene glycol monomethyl ether (number-average molecular weight: 400)
- MPEG500: Polyethylene glycol monomethyl ether (number-average molecular weight: 500)
- MPEG550: Polyethylene glycol monomethyl ether (number-average molecular weight: 550)
- MPEG1000: Polyethylene glycol monomethyl ether (number-average molecular weight: 1,000)
- MPEG2000: Polyethylene glycol monomethyl ether (number-average molecular weight: 2,000)
- MPEG5000: Polyethylene glycol monomethyl ether (number-average molecular weight: 5,000)
- PGME: Propylene glycol monomethyl ether
- PO-EO (970): Poly (oxyethylene, oxypropylene) glycol monobutyl ether (number-average molecular weight: 970) (a compound represented by the following general formula (I); in the formula, n1 represents a repeating number of the propylene oxide group (average polymerization number), n2 represents a repeating number of the ethylene oxide group (average polymerization number), and n1 and n2 are arbitrary numbers such that the number-average molecular weight is the above value.)

[Chemical formula 1]

(I)

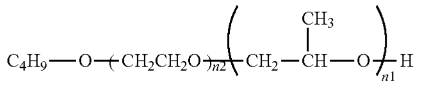

(Modifying Agent)
- TFE: 2,2,2-trifluoroethanol
- HFIP: Hexafluoroisopropanol
- BuNCO: Butyl isocyanate
- DIPA: Diisopropylamine
- Hexanol: 1-Hexanol
- FB: 4-Fluorobenzyl alcohol
- PhOH: Phenol
- FP: 4-Fluorophenol
- BL: Butyl lactate
- DBM: Dibutyl DL-Malate
- TBC: Tributyl Citrate
- DEHA: Diethylhydroxylamine
- BO: 2-Butanone oxime
- DT: 1-Dodecane thiol
- BE: 2-Bromoethanol
- IE: 2-Iodine ethanol
- TCE: 2,2,2-Trichloroethanol
- TFA: Trifluoroacetic acid
- TCA: Trichloroacetic acid
- CA: 2-Chloroacetic acid
- BBA: 2-Bromoacetic acid
- MAA: Methoxyacetic acid
- AA: Acetic acid
- PA: Pyruvic acid
- EI: Ethyl isocyanatoacetylate
- MM: Methyl thioglycolate
- DEIA: Diethyliminodiacatete
- PI: Piperidine
- EPIA: Ethyl 4-piperidinecarboxylate
- ACAC: Acetylacetone
- TFAC: Trifluoroacitylacetone
- BA: Benzoic acid
- NHS: N-Hydroxysuccinimide
- NHP: N-Hydroxyphthalimide
- LA: DL-Lactic acid
- DG: N, N-Dimethylglycine

TABLE 1

| Water-soluble (modified or unmodified) PCI | Diisocyanate | Number-average molecular weight of PCI before blocking isocyanate group terminals | Compound (1) from which terminal structure is derived | Compound (2) from which terminal structure is derived | Molar ratio of compound (1)/ compound (2) | Modifying agent | Modification rate | Solubility in 100 g of water | Average number of carbodiimide groups per molecule |
|---|---|---|---|---|---|---|---|---|---|
| A-1 | hMDI | 1485 | MPEG550 | — | 10/0 | TFE | 100% | >40 g | 0.0 |
| A-2 | hMDI | 1667 | MPEG550 | PGME | 6/4 | TFE | 100% | >40 g | 0.0 |
| A-3 | hMDI | 1592 | MPEG550 | PGME | 3/7 | TFE | 100% | >40 g | 0.0 |
| A-4 | hMDI | 1166 | MPEG550 | PGME | 1/9 | TFE | 100% | 14 g | 0.0 |
| A-5 | hMDI | 1555 | MPEG550 | — | 10/0 | HFIP | 100% | >40 g | 0.0 |

TABLE 1-continued

| Water-soluble (modified or unmodified) PCI | Diiso-cyanate | Number-average molecular weight of PCI before blocking isocyanate group terminals | Compound (1) from which terminal structure is derived | Compound (2) from which terminal structure is derived | Molar ratio of compound (1)/compound (2) | Modifying agent | Modification rate | Solubility in 100 g of water | Average number of carbodiimide groups per molecule |
|---|---|---|---|---|---|---|---|---|---|
| A-6 | hMDI | 1757 | MPEG550 | — | 10/0 | BuNCO | 100% | >40 g | 0.0 |
| A-7 | hMDI | 1407 | MPEG550 | PGME | 6/4 | BuNCO | 100% | >40 g | 0.0 |
| A-8 | hMDI | 1368 | MPEG550 | PGME | 3/7 | BuNCO | 100% | >40 g | 0.0 |
| A-9 | hMDI | 1060 | MPEG550 | PGME | 1/9 | BuNCO | 100% | 10 g | 0.0 |
| A-10 | hMDI | 1146 | MPEG550 | — | 10/0 | TFE | 100% | >40 g | 0.0 |
| A-11 | hMDI | 1258 | MPEG550 | — | 10/0 | BuNCO | 100% | >40 g | 0.0 |
| A-12 | hMDI | 834 | MPEG1000 | — | 10/0 | TFE | 5% | >40 g | 2.5 |
| A-13 | hMDI | 599 | MPEG500 | — | 10/0 | TFE | 5% | >40 g | 1.5 |
| A-14 | hMDI | 999 | MPEG550 | — | 10/0 | TFE | 31% | >40 g | 2.3 |
| A-15 | hMDI | 1136 | MPEG550 | — | 10/0 | TFE | 29% | >40 g | 2.8 |
| A-16 | hMDI | 1799 | MPEG550 | — | 10/0 | TFE | 49% | >40 g | 3.6 |
| A-17 | hMDI | 1094 | MPEG550 | — | 10/0 | TFE | 48% | >40 g | 2.0 |
| A-18 | hMDI | 1738 | MPEG550 | — | 10/0 | TFE | 59% | >40 g | 2.8 |
| A-19 | hMDI | 1436 | MPEG550 | — | 10/0 | TFE | 67% | >40 g | 1.8 |
| A-20 | hMDI | 1739 | MPEG550 | — | 10/0 | TFE | 77% | >40 g | 1.6 |
| A-21 | hMDI | 1676 | MPEG550 | — | 10/0 | BuNCO | 79% | >40 g | 1.4 |
| A-22 | hMDI | 4024 | MPEG2000 | — | 10/0 | TFE | 80% | >40 g | 3.4 |
| A-23 | hMDI | 4007 | MPEG5000 | PGME | 5/5 | BuNCO | 96% | >40 g | 0.7 |
| A-24 | hMDI | 1355 | PO-EO(970) | — | 10/0 | TFE | 76% | 31 g | 1.2 |
| A-25 | IPDI | 1167 | MPEG550 | — | 10/0 | TFE | 100% | >40 g | 0.0 |
| A-26 | HDI | 520 | MPEG400 | — | 10/0 | BuNCO | 100% | >40 g | 0.0 |
| A-27 | hMDI | 1753 | MPEG500 | — | 10/0 | — | 0% | >40 g | 6.8 |
| A-28 | TDI | 814 | MPEG550 | — | 10/0 | DIPA | 100% | >40 g | 0.0 |
| A-29 | hMDI | 1125 | MPEG550 | PGME | 1/9 | — | 0% | 11 g | 4.0 |
| A-30 | hMDI | 1592 | MPEG550 | — | 10/0 | BuNCO | 100% | >40 g | 0.0 |

TABLE 2

| Water-soluble (modified or unmodified) PCI | Diiso-cyanate | Number-average molecular weight of PCI before blocking isocyanate group terminals | Compound (1) from which terminal structure is derived | Compound (2) from which terminal structure is derived | Molar ratio of compound (1)/compound (2) | Modifying agent | Modification rate | Solubility in 100 g of water | Average number of carbodiimide groups per molecule |
|---|---|---|---|---|---|---|---|---|---|
| A-31 | hMDI | 1485 | MPEG550 | PGME | 6/4 | BuNCO | 100% | >40 g | 0.0 |
| A-32 | hMDI | 1667 | MPEG550 | PGME | 3/7 | BuNCO | 100% | >40 g | 0.0 |
| A-33 | hMDI | 1592 | MPEG550 | — | 10/0 | HFIP | 100% | >40 g | 0.0 |
| A-34 | hMDI | 1485 | MPEG550 | PGME | 6/4 | HFIP | 100% | >40 g | 0.0 |
| A-35 | hMDI | 1667 | MPEG550 | PGME | 3/7 | HFIP | 100% | >40 g | 0.0 |
| A-36 | hMDI | 1592 | MPEG550 | — | 10/0 | Hexanol | 100% | >40 g | 0.0 |
| A-37 | hMDI | 1485 | MPEG550 | PGME | 6/4 | Hexanol | 100% | >40 g | 0.0 |
| A-38 | hMDI | 1667 | MPEG550 | PGME | 3/7 | Hexanol | 100% | >40 g | 0.0 |
| A-39 | hMDI | 1592 | MPEG550 | — | 10/0 | FB | 100% | >40 g | 0.0 |
| A-40 | hMDI | 1485 | MPEG550 | PGME | 6/4 | FB | 100% | >40 g | 0.0 |
| A-41 | hMDI | 1667 | MPEG550 | PGME | 3/7 | FB | 100% | >40 g | 0.0 |
| A-42 | hMDI | 1592 | MPEG550 | — | 10/0 | PhOH | 100% | >40 g | 0.0 |
| A-43 | hMDI | 1485 | MPEG550 | PGME | 6/4 | PhOH | 100% | >40 g | 0.0 |
| A-44 | hMDI | 1667 | MPEG550 | PGME | 3/7 | PhOH | 100% | >40 g | 0.0 |
| A-45 | hMDI | 1592 | MPEG550 | — | 10/0 | FP | 100% | >40 g | 0.0 |
| A-46 | hMDI | 1485 | MPEG550 | PGME | 6/4 | FP | 100% | >40 g | 0.0 |
| A-47 | hMDI | 1667 | MPEG550 | PGME | 3/7 | FP | 100% | >40 g | 0.0 |
| A-48 | hMDI | 1592 | MPEG550 | — | 10/0 | BL | 100% | >40 g | 0.0 |
| A-49 | hMDI | 1485 | MPEG550 | PGME | 6/4 | BL | 100% | >40 g | 0.0 |
| A-50 | hMDI | 1667 | MPEG550 | PGME | 3/7 | BL | 100% | >40 g | 0.0 |
| A-51 | hMDI | 1592 | MPEG550 | — | 10/0 | DBM | 100% | >40 g | 0.0 |
| A-52 | hMDI | 1485 | MPEG550 | PGME | 6/4 | DBM | 100% | >40 g | 0.0 |
| A-53 | hMDI | 1667 | MPEG550 | PGME | 3/7 | DBM | 100% | >40 g | 0.0 |
| A-54 | hMDI | 1592 | MPEG550 | — | 10/0 | TBC | 100% | >40 g | 0.0 |
| A-55 | hMDI | 1485 | MPEG550 | PGME | 6/4 | TBC | 100% | >40 g | 0.0 |
| A-56 | hMDI | 1667 | MPEG550 | PGME | 3/7 | TBC | 100% | >40 g | 0.0 |
| A-57 | hMDI | 1592 | MPEG550 | — | 10/0 | DEHA | 100% | >40 g | 0.0 |
| A-58 | hMDI | 1485 | MPEG550 | PGME | 6/4 | DEHA | 100% | >40 g | 0.0 |
| A-59 | hMDI | 1667 | MPEG550 | PGME | 3/7 | DEHA | 100% | >40 g | 0.0 |
| A-60 | hMDI | 1592 | MPEG550 | — | 10/0 | BO | 100% | >40 g | 0.0 |
| A-61 | hMDI | 1485 | MPEG550 | PGME | 6/4 | BO | 100% | >40 g | 0.0 |
| A-62 | hMDI | 1667 | MPEG550 | PGME | 3/7 | BO | 100% | >40 g | 0.0 |
| A-63 | hMDI | 1592 | MPEG550 | — | 10/0 | DT | 100% | >40 g | 0.0 |
| A-64 | hMDI | 1485 | MPEG550 | PGME | 6/4 | DT | 100% | >40 g | 0.0 |

TABLE 3

| Water-soluble (modified or unmodified) PCI | Diiso-cyanate | Number-average molecular weight of PCI before blocking isocyanate group terminals | Compound (1) from which terminal structure is derived | Compound (2) from which terminal structure is derived | Molar ratio of compound (1)/compound (2) | Modifying agent | Modification rate | Solubility in 100 g of water | Average number of carbodiimide groups per molecule |
|---|---|---|---|---|---|---|---|---|---|
| A-65 | hMDI | 1667 | MPEG550 | PGME | 3/7 | DT | 100% | >40 g | 0.0 |
| A-66 | hMDI | 1592 | MPEG550 | — | 10/0 | BE | 100% | >40 g | 0.0 |
| A-67 | hMDI | 1485 | MPEG550 | PGME | 6/4 | BE | 100% | >40 g | 0.0 |
| A-68 | hMDI | 1667 | MPEG550 | PGME | 3/7 | BE | 100% | >40 g | 0.0 |
| A-69 | hMDI | 1592 | MPEG550 | — | 10/0 | IE | 100% | >40 g | 0.0 |
| A-70 | hMDI | 1485 | MPEG550 | PGME | 6/4 | IE | 100% | >40 g | 0.0 |
| A-71 | hMDI | 1667 | MPEG550 | PGME | 3/7 | IE | 100% | >40 g | 0.0 |
| A-72 | hMDI | 1592 | MPEG550 | — | 10/0 | TCE | 100% | >40 g | 0.0 |
| A-73 | hMDI | 1485 | MPEG550 | PGME | 6/4 | TCE | 100% | >40 g | 0.0 |
| A-74 | hMDI | 1667 | MPEG550 | PGME | 3/7 | TCE | 100% | >40 g | 0.0 |
| A-75 | hMDI | 1592 | MPEG550 | — | 10/0 | TFA | 100% | >40 g | 0.0 |
| A-76 | hMDI | 1485 | MPEG550 | PGME | 6/4 | TFA | 100% | >40 g | 0.0 |
| A-77 | hMDI | 1667 | MPEG550 | PGME | 3/7 | TFA | 100% | >40 g | 0.0 |
| A-78 | hMDI | 1592 | MPEG550 | — | 10/0 | TCA | 100% | >40 g | 0.0 |
| A-79 | hMDI | 1485 | MPEG550 | PGME | 6/4 | TCA | 100% | >40 g | 0.0 |
| A-80 | hMDI | 1667 | MPEG550 | PGME | 3/7 | TCA | 100% | >40 g | 0.0 |
| A-81 | hMDI | 1592 | MPEG550 | — | 10/0 | CA | 100% | >40 g | 0.0 |
| A-82 | hMDI | 1485 | MPEG550 | PGME | 6/4 | CA | 100% | >40 g | 0.0 |
| A-83 | hMDI | 1667 | MPEG550 | PGME | 3/7 | CA | 100% | >40 g | 0.0 |
| A-84 | hMDI | 1592 | MPEG550 | — | 10/0 | BBA | 100% | >40 g | 0.0 |
| A-85 | hMDI | 1485 | MPEG550 | PGME | 6/4 | BBA | 100% | >40 g | 0.0 |
| A-86 | hMDI | 1667 | MPEG550 | PGME | 3/7 | BBA | 100% | >40 g | 0.0 |
| A-87 | hMDI | 1592 | MPEG550 | — | 10/0 | MAA | 100% | >40 g | 0.0 |
| A-88 | hMDI | 1485 | MPEG550 | PGME | 6/4 | MAA | 100% | >40 g | 0.0 |
| A-89 | hMDI | 1667 | MPEG550 | PGME | 3/7 | MAA | 100% | >40 g | 0.0 |
| A-90 | hMDI | 1592 | MPEG550 | — | 10/0 | AA | 100% | >40 g | 0.0 |
| A-91 | hMDI | 1485 | MPEG550 | PGME | 6/4 | AA | 100% | >40 g | 0.0 |
| A-92 | hMDI | 1667 | MPEG550 | PGME | 3/7 | AA | 100% | >40 g | 0.0 |
| A-93 | hMDI | 1592 | MPEG550 | — | 10/0 | PA | 100% | >40 g | 0.0 |
| A-94 | hMDI | 1485 | MPEG550 | PGME | 6/4 | PA | 100% | >40 g | 0.0 |
| A-95 | hMDI | 1667 | MPEG550 | PGME | 3/7 | PA | 100% | >40 g | 0.0 |

TABLE 4

| Water-soluble (modified or unmodified) PCI | Diiso-cyanate | Number-average molecular weight of PCI before blocking isocyanate group terminals | Compound (1) from which terminal structure is derived | Compound (2) from which terminal structure is derived | Molar ratio of compound (1)/compound (2) | Modifying agent | Modification rate | Solubility in 100 g of water | Average number of carbodiimide groups per molecule |
|---|---|---|---|---|---|---|---|---|---|
| A-96 | hMDI | 1592 | MPEG550 | — | 10/0 | EI | 100% | >40 g | 0.0 |
| A-97 | hMDI | 1485 | MPEG550 | PGME | 6/4 | EI | 100% | >40 g | 0.0 |
| A-98 | hMDI | 1667 | MPEG550 | PGME | 3/7 | EI | 100% | >40 g | 0.0 |
| A-99 | hMDI | 1592 | MPEG550 | — | 10/0 | MM | 100% | >40 g | 0.0 |
| A-100 | hMDI | 1485 | MPEG550 | PGME | 6/4 | MM | 100% | >40 g | 0.0 |
| A-101 | hMDI | 1667 | MPEG550 | PGME | 3/7 | MM | 100% | >40 g | 0.0 |
| A-102 | TDI | 814 | MPEG550 | — | 10/0 | DIPA | 100% | >40 g | 0.0 |
| A-103 | TDI | 823 | MPEG550 | PGME | 6/4 | DIPA | 100% | >40 g | 0.0 |
| A-104 | TDI | 803 | MPEG550 | PGME | 3/7 | DIPA | 100% | >40 g | 0.0 |
| A-105 | TDI | 814 | MPEG550 | — | 10/0 | DEIA | 100% | >40 g | 0.0 |
| A-106 | TDI | 823 | MPEG550 | PGME | 6/4 | DEIA | 100% | >40 g | 0.0 |
| A-107 | TDI | 803 | MPEG550 | PGME | 3/7 | DEIA | 100% | >40 g | 0.0 |
| A-108 | TDI | 814 | MPEG550 | — | 10/0 | PI | 100% | >40 g | 0.0 |
| A-109 | TDI | 823 | MPEG550 | PGME | 6/4 | PI | 100% | >40 g | 0.0 |
| A-110 | TDI | 803 | MPEG550 | PGME | 3/7 | PI | 100% | >40 g | 0.0 |
| A-111 | TDI | 814 | MPEG550 | — | 10/0 | EPIA | 100% | >40 g | 0.0 |
| A-112 | TDI | 823 | MPEG550 | PGME | 6/4 | EPIA | 100% | >40 g | 0.0 |
| A-113 | TDI | 803 | MPEG550 | PGME | 3/7 | EPIA | 100% | >40 g | 0.0 |
| A-114 | TDI | 814 | MPEG550 | — | 10/0 | ACAC | 100% | >40 g | 0.0 |
| A-115 | TDI | 823 | MPEG550 | PGME | 6/4 | ACAC | 100% | >40 g | 0.0 |
| A-116 | TDI | 803 | MPEG550 | PGME | 3/7 | ACAC | 100% | >40 g | 0.0 |
| A-117 | TDI | 814 | MPEG550 | — | 10/0 | TFAC | 100% | >40 g | 0.0 |
| A-118 | TDI | 823 | MPEG550 | PGME | 6/4 | TFAC | 100% | >40 g | 0.0 |
| A-119 | TDI | 803 | MPEG550 | PGME | 3/7 | TFAC | 100% | >40 g | 0.0 |
| A-120 | TDI | 814 | MPEG550 | — | 10/0 | BA | 100% | >40 g | 0.0 |
| A-121 | TDI | 823 | MPEG550 | PGME | 6/4 | BA | 100% | >40 g | 0.0 |
| A-122 | TDI | 803 | MPEG550 | PGME | 3/7 | BA | 100% | >40 g | 0.0 |

TABLE 5

| Water-soluble (modified or unmodified) PCI | Diiso-cyanate | Number-average molecular weight of PCI before blocking isocyanate group terminals | Compound (1) from which terminal structure is derived | Compound (2) from which terminal structure is derived | Molar ratio of compound (1)/ compound (2) | Modifying agent | Modification rate | Solubility in 100 g of water | Average number of carbodiimide groups per molecule |
|---|---|---|---|---|---|---|---|---|---|
| A-123 | TDI | 814 | MPEG550 | — | 10/0 | AA | 100% | >40 g | 0.0 |
| A-124 | TDI | 823 | MPEG550 | PGME | 6/4 | AA | 100% | >40 g | 0.0 |
| A-125 | TDI | 803 | MPEG550 | PGME | 3/7 | AA | 100% | >40 g | 0.0 |
| A-126 | TDI | 814 | MPEG550 | — | 10/0 | NHS | 100% | >40 g | 0.0 |
| A-127 | TDI | 823 | MPEG550 | PGME | 6/4 | NHS | 100% | >40 g | 0.0 |
| A-128 | TDI | 803 | MPEG550 | PGME | 3/7 | NHS | 100% | >40 g | 0.0 |
| A-129 | TDI | 814 | MPEG550 | — | 10/0 | NHP | 100% | >40 g | 0.0 |
| A-130 | TDI | 823 | MPEG550 | PGME | 6/4 | NHP | 100% | >40 g | 0.0 |
| A-131 | TDI | 803 | MPEG550 | PGME | 3/7 | NHP | 100% | >40 g | 0.0 |
| A-132 | hMDI | 1592 | MPEG550 | — | 10/0 | LA | 100% | >40 g | 0.0 |
| A-133 | hMDI | 1485 | MPEG550 | PGME | 6/4 | LA | 100% | >40 g | 0.0 |
| A-134 | hMDI | 1667 | MPEG550 | PGME | 3/7 | LA | 100% | >40 g | 0.0 |
| A-135 | hMDI | 1592 | MPEG550 | — | 10/0 | DG | 100% | >40 g | 0.0 |
| A-136 | hMDI | 1485 | MPEG550 | PGME | 6/4 | DG | 100% | >40 g | 0.0 |
| A-137 | hMDI | 1667 | MPEG550 | PGME | 3/7 | DG | 100% | >40 g | 0.0 |
| A-138 | hMDI | 879 | MPEG550 | — | 10/0 | — | 0% | >40 g | 2.8 |
| A-139 | hMDI | 700 | MPEG550 | — | 10/0 | — | 0% | >40 g | 2.0 |
| A-140 | hMDI | 1592 | MPEG550 | — | 10/0 | HFIP | 90% | >40% | 0.6 |
| A-141 | hMDI | 1485 | MPEG550 | PGME | 6/4 | HFIP | 85% | >40% | 0.8 |
| A-142 | hMDI | 1667 | MPEG550 | PGME | 3/7 | HFIP | 80% | >40% | 1.3 |
| A-143 | TDI | 814 | MPEG550 | PGME | 9/1 | PI | 100% | >40 g | 0.0 |
| A-144 | TDI | 814 | MPEG550 | PGME | 1/9 | PI | 100% | 20 g | 0.0 |

Synthesis Example 145

(Synthesis of Water-Insoluble Polycarbodiimide B-1)

100 g of dicyclohexylmethane-4,4'-diisocyanate, 58 g of cyclohexyl isocyanate (CHI), and 0.5 g of 3-methyl-1-phenyl-2-phospholene-1-oxide (carbodiimidization catalyst) were placed in a SUS316 stirring tank with an internal volume of 1 L, and the resulting mixture was reacted at 190° C. for 72 hours under a nitrogen atmosphere to obtain a water-insoluble polycarbodiimide B-1. After the reaction, no absorption peak around 2250 $cm^{-1}$ derived from the isocyanate group was observed in the infrared absorption (IR) spectrum measurement, and an absorption peak around 2150 $cm^{-1}$ derived from the carbodiimide group was observed. The number-average molecular weight of the obtained polycarbodiimide was 567 g/mol. The number-average molecular weight of polycarbodiimide (PCI) before blocking isocyanate group terminals was calculated by subtracting the blocked structure from the number-average molecular weight based on the following formula, and it was 405 g/mol. The NCN equivalent determined from the absorption peak around 2150 $cm^{-1}$ derived from the carbodiimide group was 212 g/mol, and the average number of carbodiimide groups per molecule was 2.7.

(Number-average molecular weight of polycarbodiimide (PCI) before blocking isocyanate group terminals)=(Number-average molecular weight of polycarbodiimide obtained by GPC after blocking terminals)−2×(Cyclohexyl isocyanate molecular weight: 125 g/mol)+2×(Molecular weight of carbon dioxide: 44 g/mol)

Synthesis Examples 146 to 162

(Synthesis of Water-Insoluble Polycarbodiimides B-2 to B-18)

Each water-insoluble polycarbodiimide was obtained using the diisocyanates and the compounds from which the terminal structures were derived shown in Table 6 in the same manner as in Synthesis Example 145, except that the number-average molecular weight of the isocyanate-terminated polycarbodiimide (polycarbodiimide before blocking isocyanate group terminals) and the modification rate of the obtained water-insoluble polycarbodiimide were set to the values shown in Table 6.

For the water-insoluble modified polycarbodiimide using a modifying agent, it was obtained such that the modifying agents shown in Table 6 were added after obtaining a water-insoluble polycarbodiimide in which the isocyanate group terminals were blocked in the same manner as in Synthesis Example 145, and the resulting mixture was reacted at 40° C. for 72 hours under a nitrogen atmosphere to obtain a water-insoluble modified polycarbodiimide. After the reaction, an absorption peak around a wavelength of 2150 $cm^{-1}$ derived from the carbodiimide group was confirmed by infrared absorption (IR) spectrum measurement.

In Table 6, each abbreviation means the following compounds.

(Diisocyanate)

HDI: Hexamethylene diisocyanate hMDI: Dicyclohexylmethane-4,4'-diisocyanate

IPDI: Isophorone diisocyanate (isomer mixture)

TMXDI: 1,3-Bis (2-isocyanato-2-propyl) benzene (Compound from which the terminal structures are derived)

CHI: Cyclohexyl isocyanate

IDBI: 3-Isopropenyl-α, α-dimethylbenzyl isocyanate

TABLE 6

| Water-insoluble PCI | Diiso-cyanate | Number-average molecular weight of PCI before blocking isocyanate group terminals | Compound (1) from which terminal structure is derived | Molar ratio of compound (1)/compound (2) | Modifying agent | Modification rate | Solubility in 100 g of water | Average number of carbodiimide groups per molecule |
|---|---|---|---|---|---|---|---|---|
| B-1 | hMDI | 405 | CHI | 10/0 | — | 0% | <1 g | 2.7 |
| B-2 | hMDI | 738 | CHI | 10/0 | — | 0% | <1 g | 4.2 |
| B-3 | hMDI | 1054 | CHI | 10/0 | — | 0% | <1 g | 5.6 |
| B-4 | hMDI | 1186 | CHI | 10/0 | — | 0% | <1 g | 6.2 |
| B-5 | hMDI | 2764 | CHI | 10/0 | — | 0% | <1 g | 13.5 |
| B-6 | hMDI | 3566 | CHI | 10/0 | — | 0% | <1 g | 17.1 |
| B-7 | hMDI | 4182 | CHI | 10/0 | — | 0% | <1 g | 20.0 |
| B-8 | hMDI | 1599 | PGME | 10/0 | — | 0% | <1 g | 8.1 |
| B-9 | hMDI | 865 | PGME | 10/0 | — | 0% | <1 g | 4.8 |
| B-10 | hMDI | 785 | CHI | 10/0 | TFE | 10% | <1 g | 4.2 |
| B-11 | hMDI | 657 | CHI | 10/0 | TFE | 31% | <1 g | 3.2 |
| B-12 | hMDI | 626 | CHI | 10/0 | TFE | 49% | <1 g | 2.8 |
| B-13 | hMDI | 672 | CHI | 10/0 | TFE | 69% | <1 g | 2.6 |
| B-14 | hMDI:IPID = 1:1 | 461 | CHI | 10/0 | — | 0% | <1 g | 2.9 |
| B-15 | hMDI:HDI = 4:1 | 420 | CHI | 10/0 | — | 0% | <1 g | 2.7 |
| B-16 | TMXDI | 617 | IDBI | 10/0 | — | 0% | <1 g | 3.9 |
| B-17 | hMDI | 405 | CHI | 10/0 | BuNCO | 10% | <1 g | 2.6 |
| B-18 | hMDI | 970 | CHI | 10/0 | TFE | 48% | <1 g | 3.7 |

Example 1

(Production of Carbodiimide Composition PC-a1)

4 g of water-soluble modified polycarbodiimide A-1 and 1.4 g of water-insoluble polycarbodiimide B-1 were placed in a 100 mL eggplant flask, and 20 g of tetrahydrofuran (THF) was added to prepare a THF solution of polycarbodiimide. Then, 30 g of ion-exchanged water was added to the THF solution of polycarbodiimide to obtain a milky white solution. The remaining THF was distilled off under reduced pressure together with ion-exchanged water under the conditions of a liquid temperature of 40° C. and a vacuum degree of 5 kPa, and then ion-exchanged water was added to obtain a milky white carbodiimide composition PC-a1 having a solid content of 10% by mass.

Examples 2 to 171 and Comparative Examples 1 to 11

(Production of Carbodiimide Compositions PC-a2-PC-a171 and PC-b1-PC-b11)

Each carbodiimide composition was prepared in the same manner as in Example 1 except that the types and blending ratios of the water-soluble modified polycarbodiimide and the water-insoluble polycarbodiimide were as shown in Tables 7 to 13.

In the carbodiimide composition using sodium dodecylbenzenesulfonate (DBS) as the surfactant, when ion-exchanged water was added, DBS was also added at the same time so as to be the amount shown in Tables 9 and 13.

TABLE 7

| Carbodiimide composition | | Composition | | | Evaluation | | | |
|---|---|---|---|---|---|---|---|---|
| | | Water-soluble modified PCI | Water-insoluble PCI | Mass ratio of water-soluble modified PCI/water-insoluble PCI | Storage stability | Low-temperature curability | Water resistance of coating film (structure retention) | Water resistance of coating film (whitening resistance) |
| Ex. 1 | PC-a1 | A-1 | B-1 | 50/50 | ○ | ○ | ○ | ◎ |
| Ex. 2 | PC-a2 | A-2 | B-1 | 50/50 | ○ | ○ | ○ | ◎ |
| Ex. 3 | PC-a3 | A-3 | B-1 | 50/50 | ○ | ○ | ○ | ◎ |
| Ex. 4 | PC-a4 | A-4 | B-1 | 50/50 | ○ | ○ | ○ | ◎ |
| Ex. 5 | PC-a5 | A-5 | B-1 | 50/50 | ○ | ○ | ○ | ◎ |
| Ex. 6 | PC-a6 | A-6 | B-1 | 50/50 | ○ | ○ | ○ | Δ |
| Ex. 7 | PC-a7 | A-7 | B-1 | 50/50 | ○ | ○ | ○ | Δ |
| Ex. 8 | PC-a8 | A-8 | B-1 | 50/50 | ○ | ○ | ○ | Δ |
| Ex. 9 | PC-a9 | A-9 | B-1 | 50/50 | ○ | ○ | ○ | Δ |
| Ex. 10 | PC-a10 | A-10 | B-1 | 50/50 | ○ | ○ | ○ | ◎ |
| Ex. 11 | PC-a11 | A-11 | B-1 | 50/50 | ○ | ○ | ○ | Δ |
| Ex. 12 | PC-a12 | A-12 | B-2 | 50/50 | Δ | ○ | ○ | ◎ |
| Ex. 13 | PC-a13 | A-13 | B-2 | 50/50 | ○ | ○ | ○ | ◎ |
| Ex. 14 | PC-a14 | A-14 | B-2 | 50/50 | ○ | ○ | ○ | ◎ |
| Ex. 15 | PC-a15 | A-15 | B-2 | 50/50 | Δ | ○ | ○ | ◎ |
| Ex. 16 | PC-a16 | A-16 | B-2 | 50/50 | Δ | ○ | ○ | ○ |
| Ex. 17 | PC-a17 | A-17 | B-2 | 50/50 | ○ | ○ | ○ | ◎ |
| Ex. 18 | PC-a18 | A-18 | B-2 | 50/50 | ○ | ○ | ○ | ◎ |
| Ex. 19 | PC-a19 | A-19 | B-2 | 50/50 | ○ | ○ | ○ | ◎ |
| Ex. 20 | PC-a20 | A-20 | B-2 | 50/50 | ○ | ○ | ○ | ◎ |
| Ex. 21 | PC-a21 | A-21 | B-2 | 50/50 | ○ | ○ | ○ | Δ |
| Ex. 22 | PC-a22 | A-22 | B-2 | 50/50 | ○ | ○ | ○ | ○ |
| Ex. 23 | PC-a23 | A-23 | B-2 | 50/50 | ○ | ○ | ○ | Δ |

TABLE 7-continued

| | | Composition | | | Evaluation | | | |
|---|---|---|---|---|---|---|---|---|
| Carbodiimide composition | | Water-soluble modified PCI | Water-insoluble PCI | Mass ratio of water-soluble modified PCI/ water-insoluble PCI | Storage stability | Low-temperature curability | Water resistance of coating film (structure retention) | Water resistance of coating film (whitening resistance) |
| Ex. 24 | PC-a24 | A-24 | B-2 | 60/40 | ○ | ○ | ○ | ◎ |
| Ex. 25 | PC-a25 | A-25 | B-2 | 50/50 | ○ | ○ | ○ | ◎ |
| Ex. 26 | PC-a26 | A-26 | B-2 | 50/50 | ○ | ○ | ○ | Δ |
| Ex. 27 | PC-a27 | A-1 | B-1 | 10/90 | ○ | ○ | ○ | ◎ |
| Ex. 28 | PC-a28 | A-1 | B-1 | 20/80 | ○ | ○ | ○ | ◎ |
| Ex. 29 | PC-a29 | A-1 | B-1 | 30/70 | ○ | ○ | ○ | ◎ |
| Ex. 30 | PC-a30 | A-1 | B-1 | 40/60 | ○ | ○ | ○ | ◎ |
| Ex. 31 | PC-a31 | A-1 | B-1 | 60/40 | ○ | ○ | ○ | ◎ |
| Ex. 32 | PC-a32 | A-1 | B-1 | 70/30 | ○ | ○ | ○ | ◎ |
| Ex. 33 | PC-a33 | A-1 | B-1 | 80/20 | ○ | Δ | ○ | ◎ |

TABLE 8

| | | Composition | | | Evaluation | | | |
|---|---|---|---|---|---|---|---|---|
| Carbodiimide composition | | Water-soluble modified PCI | Water-insoluble PCI | Mass ratio of water-soluble modified PCI/ water-insoluble PCI | Storage stability | Low-temperature curability | Water resistance of coating film (structure retention) | Water resistance of coating film (whitening resistance) |
| Ex. 34 | PC-a34 | A-21 | B-2 | 10/90 | ○ | ○ | ○ | Δ |
| Ex. 35 | PC-a35 | A-21 | B-2 | 20/80 | ○ | ○ | ○ | Δ |
| Ex. 36 | PC-a36 | A-21 | B-2 | 30/70 | ○ | ○ | ○ | Δ |
| Ex. 37 | PC-a37 | A-21 | B-2 | 40/60 | ○ | ○ | ○ | Δ |
| Ex. 38 | PC-a38 | A-21 | B-2 | 60/40 | ○ | ○ | ○ | Δ |
| Ex. 39 | PC-a39 | A-21 | B-2 | 70/30 | ○ | ○ | ○ | Δ |
| Ex. 40 | PC-a40 | A-21 | B-2 | 80/20 | ○ | ○ | ○ | Δ |
| Ex. 41 | PC-a41 | A-21 | B-2 | 90/10 | ○ | ○ | ○ | Δ |
| Ex. 42 | PC-a42 | A-1 | B-2 | 50/50 | ○ | ○ | ○ | ◎ |
| Ex. 43 | PC-a43 | A-1 | B-3 | 50/50 | ○ | ○ | ○ | ◎ |
| Ex. 44 | PC-a44 | A-1 | B-4 | 50/50 | ○ | ○ | ○ | ◎ |
| Ex. 45 | PC-a45 | A-1 | B-5 | 60/40 | ○ | ○ | ○ | ◎ |
| Ex. 46 | PC-a46 | A-1 | B-6 | 70/30 | ○ | ○ | ○ | ◎ |
| Ex. 47 | PC-a47 | A-1 | B-7 | 70/30 | ○ | ○ | ○ | ◎ |
| Ex. 48 | PC-a48 | A-1 | B-8 | 40/60 | ○ | ○ | ○ | ◎ |
| Ex. 49 | PC-a49 | A-1 | B-9 | 40/60 | ○ | ○ | ○ | ◎ |
| Ex. 50 | PC-a50 | A-21 | B-10 | 40/60 | ○ | ○ | ○ | ◎ |
| Ex. 51 | PC-a51 | A-21 | B-11 | 40/60 | ○ | ○ | ○ | ◎ |
| Ex. 52 | PC-a52 | A-21 | B-12 | 40/60 | ○ | ○ | ○ | ◎ |
| Ex. 53 | PC-a53 | A-21 | B-13 | 40/60 | ○ | Δ | Δ | ◎ |
| Ex. 54 | PC-a54 | A-1 | B-14 | 60/40 | ○ | ○ | ○ | ◎ |
| Ex. 55 | PC-a55 | A-1 | B-15 | 60/40 | ○ | ○ | Δ | ◎ |

TABLE 9

| | | Composition | | | | | Evaluation | | | |
|---|---|---|---|---|---|---|---|---|---|---|
| Carbodiimide composition | | Water-soluble modified PCI (1) | Water-insoluble PCI | Mass ratio of water-soluble modified PCI/ water-insoluble PCI | Surfactant | Amount of surfactant (mass %) | Storage stability | Low-temperature curability | Water resistance of coating film (structure retention) | Water resistance of coating film (whitening resistance) |
| Ex. 56 | PC-a56 | A-1 | B-1 | 50/50 | DBS | 0.1 | ○ | ○ | ○ | ◎ |

TABLE 10

| | Carbodiimide composition | Composition | | | Evaluation | | | |
|---|---|---|---|---|---|---|---|---|
| | | Water-soluble modified PCI | Water-insoluble PCI | Mass ratio of water-soluble modified PCI/water-insoluble PCI | Storage stability | Low-temperature curability | Water resistance of coating film (structure retention) | Water resistance of coating film (whitening resistance) |
| Ex. 57 | PC-a57 | A-30 | B-2 | 50/50 | ○ | ○ | ○ | A |
| Ex. 58 | PC-a58 | A-31 | B-2 | 50/50 | ○ | ○ | ○ | A |
| Ex. 59 | PC-a59 | A-32 | B-2 | 50/50 | ○ | ○ | ○ | Δ |
| Ex. 60 | PC-a60 | A-33 | B-2 | 50/50 | ○ | ○ | ○ | ◎ |
| Ex. 61 | PC-a61 | A-34 | B-2 | 50/50 | ○ | ○ | ○ | ◎ |
| Ex. 62 | PC-a62 | A-35 | B-2 | 50/50 | ○ | ○ | ○ | ◎ |
| Ex. 63 | PC-a63 | A-36 | B-2 | 50/50 | ○ | ○ | ○ | Δ |
| Ex. 64 | PC-a64 | A-37 | B-2 | 50/50 | ○ | ○ | ○ | Δ |
| Ex. 65 | PC-a65 | A-38 | B-2 | 50/50 | ○ | ○ | ○ | Δ |
| Ex. 66 | PC-a66 | A-39 | B-2 | 50/50 | ○ | ○ | ○ | ◎ |
| Ex. 67 | PC-a67 | A-40 | B-2 | 50/50 | ○ | ○ | ○ | ◎ |
| Ex. 68 | PC-a68 | A-41 | B-2 | 50/50 | ○ | ○ | ○ | ◎ |
| Ex. 69 | PC-a69 | A-42 | B-2 | 50/50 | ○ | ○ | ○ | ○ |
| Ex. 70 | PC-a70 | A-43 | B-2 | 50/50 | ○ | ○ | ○ | ○ |
| Ex. 71 | PC-a71 | A-44 | B-2 | 50/50 | ○ | ○ | ○ | ○ |
| Ex. 72 | PC-a72 | A-45 | B-2 | 50/50 | ○ | ○ | ○ | ◎ |
| Ex. 73 | PC-a73 | A-46 | B-2 | 50/50 | ○ | ○ | ○ | ◎ |
| Ex. 74 | PC-a74 | A-47 | B-2 | 50/50 | ○ | ○ | ○ | ◎ |
| Ex. 75 | PC-a75 | A-48 | B-2 | 50/50 | ○ | ○ | ○ | ○ |
| Ex. 76 | PC-a76 | A-49 | B-2 | 50/50 | ○ | ○ | ○ | ○ |
| Ex. 77 | PC-a77 | A-50 | B-2 | 50/50 | ○ | ○ | ○ | ○ |
| Ex. 78 | PC-a78 | A-51 | B-2 | 50/50 | ○ | ○ | ○ | ○ |
| Ex. 79 | PC-a79 | A-52 | B-2 | 50/50 | ○ | ○ | ○ | ○ |
| Ex. 80 | PC-a80 | A-53 | B-2 | 50/50 | ○ | ○ | ○ | ○ |
| Ex. 81 | PC-a81 | A-54 | B-2 | 50/50 | ○ | ○ | ○ | ○ |
| Ex. 82 | PC-a82 | A-55 | B-2 | 50/50 | ○ | ○ | ○ | ○ |
| Ex. 83 | PC-a83 | A-56 | B-2 | 50/50 | ○ | ○ | ○ | ○ |
| Ex. 84 | PC-a84 | A-57 | B-2 | 50/50 | ○ | ○ | ○ | ○ |
| Ex. 85 | PC-a85 | A-58 | B-2 | 50/50 | ○ | ○ | ○ | ○ |
| Ex. 86 | PC-a86 | A-59 | B-2 | 50/50 | ○ | ○ | ○ | ○ |
| Ex. 87 | PC-a87 | A-60 | B-2 | 50/50 | ○ | ○ | ○ | ○ |
| Ex. 88 | PC-a88 | A-61 | B-2 | 50/50 | ○ | ○ | ○ | ○ |
| Ex. 89 | PC-a89 | A-62 | B-2 | 50/50 | ○ | ○ | ○ | ○ |
| Ex. 90 | PC-a90 | A-63 | B-2 | 50/50 | ○ | ○ | ○ | Δ |
| Ex. 91 | PC-a91 | A-64 | B-2 | 50/50 | ○ | ○ | ○ | Δ |
| Ex. 92 | PC-a92 | A-65 | B-2 | 50/50 | ○ | ○ | ○ | Δ |
| Ex. 93 | PC-a93 | A-66 | B-2 | 50/50 | ○ | ○ | ○ | ○ |
| Ex. 94 | PC-a94 | A-67 | B-2 | 50/50 | ○ | ○ | ○ | ◎ |
| Ex. 95 | PC-a95 | A-68 | B-2 | 50/50 | ○ | ○ | ○ | ◎ |

TABLE 11

| | Carbodiimide composition | Composition | | | Evaluation | | | |
|---|---|---|---|---|---|---|---|---|
| | | Water-soluble modified PCI | Water-insoluble PCI | Mass ratio of water-soluble modified PCI/water-insoluble PCI | Storage stability | Low-temperature curability | Water resistance of coating film (structure retention) | Water resistance of coating film (whitening resistance) |
| Ex. 96 | PC-a96 | A-69 | B-2 | 50/50 | ○ | ○ | ○ | ○ |
| Ex. 97 | PC-a97 | A-70 | B-2 | 50/50 | ○ | ○ | ○ | ◎ |
| Ex. 98 | PC-a98 | A-71 | B-2 | 50/50 | ○ | ○ | ○ | ◎ |
| Ex. 99 | PC-a99 | A-72 | B-2 | 50/50 | ○ | ○ | ○ | ○ |
| Ex. 100 | PC-a100 | A-73 | B-2 | 50/50 | ○ | ○ | ○ | ◎ |
| Ex. 101 | PC-a101 | A-74 | B-2 | 50/50 | ○ | ○ | ○ | ◎ |
| Ex. 102 | PC-a102 | A-75 | B-2 | 50/50 | ○ | ○ | ○ | ◎ |
| Ex. 103 | PC-a103 | A-76 | B-2 | 50/50 | ○ | ○ | ○ | ◎ |
| Ex. 104 | PC-a104 | A-77 | B-2 | 50/50 | ○ | ○ | ○ | ◎ |
| Ex. 105 | PC-a105 | A-78 | B-2 | 50/50 | ○ | ○ | ○ | ○ |
| Ex. 106 | PC-a106 | A-79 | B-2 | 50/50 | ○ | ○ | ○ | ◎ |
| Ex. 107 | PC-a107 | A-80 | B-2 | 50/50 | ○ | ○ | ○ | ◎ |
| Ex. 108 | PC-a108 | A-81 | B-2 | 50/50 | ○ | ○ | ○ | ○ |
| Ex. 109 | PC-a109 | A-82 | B-2 | 50/50 | ○ | ○ | ○ | ◎ |
| Ex. 110 | PC-a110 | A-83 | B-2 | 50/50 | ○ | ○ | ○ | ◎ |
| Ex. 111 | PC-a111 | A-84 | B-2 | 50/50 | ○ | ○ | ○ | ○ |
| Ex. 112 | PC-a112 | A-85 | B-2 | 50/50 | ○ | ○ | ○ | ◎ |
| Ex. 113 | PC-a113 | A-86 | B-2 | 50/50 | ○ | ○ | ○ | ◎ |

TABLE 11-continued

| | | Composition | | | Evaluation | | | |
|---|---|---|---|---|---|---|---|---|
| Carbodiimide composition | | Water-soluble modified PCI | Water-insoluble PCI | Mass ratio of water-soluble modified PCI/ water-insoluble PCI | Storage stability | Low-temperature curability | Water resistance of coating film (structure retention) | Water resistance of coating film (whitening resistance) |
| Ex. 114 | PC-a114 | A-87 | B-2 | 50/50 | ○ | ○ | ○ | ○ |
| Ex. 115 | PC-a115 | A-88 | B-2 | 50/50 | ○ | ○ | ○ | ○ |
| Ex. 116 | PC-a116 | A-89 | B-2 | 50/50 | ○ | ○ | ○ | ○ |
| Ex. 117 | PC-a117 | A-90 | B-2 | 50/50 | ○ | ○ | ○ | Δ |
| Ex. 118 | PC-a118 | A-91 | B-2 | 50/50 | ○ | ○ | ○ | Δ |
| Ex. 119 | PC-a119 | A-92 | B-2 | 50/50 | ○ | ○ | ○ | Δ |
| Ex. 120 | PC-a120 | A-93 | B-2 | 50/50 | ○ | ○ | ○ | ○ |
| Ex. 121 | PC-a121 | A-94 | B-2 | 50/50 | ○ | ○ | ○ | ○ |
| Ex. 122 | PC-a122 | A-95 | B-2 | 50/50 | ○ | ○ | ○ | ○ |
| Ex. 123 | PC-a123 | A-96 | B-2 | 50/50 | ○ | ○ | ○ | ○ |
| Ex. 124 | PC-a124 | A-97 | B-2 | 50/50 | ○ | ○ | ○ | ○ |
| Ex. 125 | PC-a125 | A-98 | B-2 | 50/50 | ○ | ○ | ○ | ○ |
| Ex. 126 | PC-a126 | A-99 | B-2 | 50/50 | ○ | ○ | ○ | ○ |
| Ex. 127 | PC-a127 | A-100 | B-2 | 50/50 | ○ | ○ | ○ | ○ |
| Ex. 128 | PC-a128 | A-101 | B-2 | 50/50 | ○ | ○ | ○ | ○ |
| Ex. 129 | PC-a129 | A-102 | B-16 | 50/50 | ○ | ○ | ○ | Δ |
| Ex. 130 | PC-a130 | A-103 | B-16 | 50/50 | ○ | ○ | ○ | Δ |
| Ex. 131 | PC-a131 | A-104 | B-16 | 50/50 | ○ | ○ | ○ | Δ |
| Ex. 132 | PC-a132 | A-105 | B-16 | 50/50 | ○ | ○ | ○ | ○ |
| Ex. 133 | PC-a133 | A-106 | B-16 | 50/50 | ○ | ○ | ○ | ○ |
| Ex. 134 | PC-a134 | A-107 | B-16 | 50/50 | ○ | ○ | ○ | ○ |

TABLE 12

| | | Composition | | | Evaluation | | | |
|---|---|---|---|---|---|---|---|---|
| Carbodiimide composition | | Water-soluble modified PCI | Water-insoluble PCI | Mass ratio of water-soluble modified PCI/ water-insoluble PCI | Storage stability | Low-temperature curability | Water resistance of coating film (structure retention) | Water resistance of coating film (whitening resistance) |
| Ex. 135 | PC-a135 | A-108 | B-16 | 50/50 | ○ | ○ | ○ | Δ |
| Ex. 136 | PC-a136 | A-109 | B-16 | 50/50 | ○ | ○ | ○ | ○ |
| Ex. 137 | PC-a137 | A-110 | B-16 | 50/50 | ○ | ○ | ○ | ○ |
| Ex. 138 | PC-a138 | A-111 | B-16 | 50/50 | ○ | ○ | ○ | ○ |
| Ex. 139 | PC-a139 | A-112 | B-16 | 50/50 | ○ | ○ | ○ | ○ |
| Ex. 140 | PC-a140 | A-113 | B-16 | 50/50 | ○ | ○ | ○ | ○ |
| Ex. 141 | PC-a141 | A-114 | B-16 | 50/50 | ○ | ○ | ○ | Δ |
| Ex. 142 | PC-a142 | A-115 | B-16 | 50/50 | ○ | ○ | ○ | Δ |
| Ex. 143 | PC-a143 | A-116 | B-16 | 50/50 | ○ | ○ | ○ | Δ |
| Ex. 144 | PC-a144 | A-117 | B-16 | 50/50 | ○ | ○ | ○ | ◎ |
| Ex. 145 | PC-a145 | A-118 | B-16 | 50/50 | ○ | ○ | ○ | ◎ |
| Ex. 146 | PC-a146 | A-119 | B-16 | 50/50 | ○ | ○ | ○ | ◎ |
| Ex. 147 | PC-a147 | A-120 | B-16 | 50/50 | ○ | ○ | ○ | ○ |
| Ex. 148 | PC-a148 | A-121 | B-16 | 50/50 | ○ | ○ | ○ | ○ |
| Ex. 149 | PC-a149 | A-122 | B-16 | 50/50 | ○ | ○ | ○ | ○ |
| Ex. 150 | PC-a150 | A-123 | B-16 | 50/50 | ○ | ○ | ○ | Δ |
| Ex. 151 | PC-a151 | A-124 | B-16 | 50/50 | ○ | ○ | ○ | Δ |
| Ex. 152 | PC-a152 | A-125 | B-16 | 50/50 | ○ | ○ | ○ | Δ |
| Ex. 153 | PC-a153 | A-126 | B-16 | 50/50 | ○ | ○ | ○ | ○ |
| Ex. 154 | PC-a154 | A-127 | B-16 | 50/50 | ○ | ○ | ○ | ○ |
| Ex. 155 | PC-a155 | A-128 | B-16 | 50/50 | ○ | ○ | ○ | ○ |
| Ex. 156 | PC-a156 | A-129 | B-16 | 50/50 | ○ | ○ | ○ | ○ |
| Ex. 157 | PC-a157 | A-130 | B-16 | 50/50 | ○ | ○ | ○ | ○ |
| Ex. 158 | PC-a158 | A-131 | B-16 | 50/50 | ○ | ○ | ○ | ○ |
| Ex. 159 | PC-a159 | A-132 | B-2 | 50/50 | ○ | ○ | ○ | ○ |
| Ex. 160 | PC-a160 | A-133 | B-2 | 50/50 | ○ | ○ | ○ | ○ |
| Ex. 161 | PC-a161 | A-134 | B-2 | 50/50 | ○ | ○ | ○ | ○ |
| Ex. 162 | PC-a162 | A-135 | B-2 | 50/50 | ○ | ○ | ○ | ○ |
| Ex. 163 | PC-a163 | A-136 | B-2 | 50/50 | ○ | ○ | ○ | ○ |
| Ex. 164 | PC-a164 | A-137 | B-2 | 50/50 | ○ | ○ | ○ | ○ |
| Ex. 165 | PC-a165 | A-140 | B-2 | 50/50 | ○ | ○ | ○ | ◎ |
| Ex. 166 | PC-a166 | A-141 | B-2 | 50/50 | ○ | ○ | ○ | ◎ |

TABLE 12-continued

| Carbodiimide composition | Composition | | | Evaluation | | | |
|---|---|---|---|---|---|---|---|
| | Water-soluble modified PCI | Water-insoluble PCI | Mass ratio of water-soluble modified PCI/water-insoluble PCI | Storage stability | Low-temperature curability | Water resistance of coating film (structure retention) | Water resistance of coating film (whitening resistance) |
| Ex. 167 PC-a167 | A-142 | B-2 | 50/50 | ○ | ○ | ○ | ◎ |
| Ex. 168 PC-a168 | A-8 | B-17 | 50/50 | ○ | ○ | ○ | ○ |
| Ex. 169 PC-a169 | A-16 | B-18 | 50/50 | Δ | Δ | ○ | ○ |
| Ex. 170 PC-a170 | A-143 | B-16 | 50/50 | ○ | ○ | ○ | ○ |
| Ex. 171 PC-a171 | A-144 | B-16 | 50/50 | ○ | ○ | ○ | Δ |

TABLE 13

| Carbodiimidc composition | Composition | | | | | | | Evaluation | | | |
|---|---|---|---|---|---|---|---|---|---|---|---|
| | Water-soluble modified PCI (1) | Water-insoluble PCI | Mass ratio of water-soluble modified PCI/water-insoluble PCI | Surfactant | Amount of surfactant (mass %) | Storage stability | Low temperature curability | Water resistance of coating film (structure retention) | Water resistance of coating film (whitening resistance) | Water-soluble modified PCI (1) | Water-insoluble PCI |
| Com. Ex. 1 PC-b1 | A-27 | — | B-4 | 40/60 | — | DBS | 3.0 | X | ○ | ○ | X |
| Com. Ex. 2 PC-b2 | A-28 | — | — | 100/0 | — | — | — | ○ | X | X | X |
| Com. Ex. .3 PC-b3 | A-6 | — | — | 100/0 | — | — | — | ○ | X | X | X |
| Com. Ex. 4 PC-b4 | A-1 | — | — | 100/0 | — | — | — | ○ | X | X | X |
| Com. Ex. 5 PC-b5 | A-6 | A-29 | — | — | 50/50 | — | — | X | ○ | ○ | X |
| Com. Ex. 6 PC-b6 | A-27 | — | B-4 | 50/50 | — | DBS | 3.0 | X | ○ | ○ | X |
| Com. Ex. 7 PC-b7 | A-27 | — | B-4 | 50/50 | — | — | — | X | ○ | ○ | X |
| Com. Ex. 8 PC-b8 | A-138 | — | B-2 | 50/50 | — | DBS | 3.0 | X | ○ | ○ | X |
| Com. Ex. 9 PC-b9 | A-138 | — | B-2 | 50/50 | — | — | — | X | ○ | ○ | X |
| Com. Ex. 10 PC-b10 | A-139 | — | B-2 | 50/50 | — | DBS | 3.0 | X | ○ | ○ | X |
| Com. Ex. 11 PC-b11 | A-139 | — | B-2 | 50/50 | — | — | — | X | ○ | ○ | X |

As shown in Tables 7 to 12, the carbodiimide compositions PC-a1 to PC-a171 (Examples 1 to 171) showed good storage stability and low-temperature curability when used as a coating composition, and showed good water resistance (structure retention, whitening resistance) when formed into a coating film.

Further, when comparing the carbodiimide compositions PC-a12 and PC-a13 (Examples 12 and 13) using water-soluble modified polycarbodiimides having different number-average molecular weights of the compounds from which the terminal structures were derived, there was a tendency that the smaller the number-average molecular weight of the compound from which the terminal structures were derived, the better the storage stability of the coating composition.

Further, when comparing the carbodiimide compositions PC-a14 and PC-a15 (Examples 14 and 15), and the carbodiimide compositions PC-a16 and PC-a17 (Examples 16 and 17), using water-soluble modified polycarbodiimides having different number-average molecular weights of polycarbodiimide without blocking the isocyanate group terminals, there was a tendency that the smaller the number-average molecular weight of the polycarbodiimide without blocking the isocyanate group terminals, the better the storage stability of the coating composition.

Further, when comparing the carbodiimide compositions PC-a15 and PC-a17 (Examples 15 and 17), and the carbodiimide compositions PC-a16 and PC-a18 (Examples 16 and 18), using water-soluble modified polycarbodiimides with different modification rates, there was a tendency that the higher the modification rate of the water-soluble modified polycarbodiimide, the better the storage stability of the coating composition.

Further, when comparing the carbodiimide compositions PC-a50 to PC-a53 (Examples 50 to 53) using water-insoluble polycarbodiimides with different modification rates, there was a tendency that the lower the modification rate of the water-insoluble polycarbodiimide, the better the low-temperature curability when used as a coating composition and the better the water resistance (structure retention) when formed into a coating film.

Further, when comparing the carbodiimide compositions PC-a54 and PC-a55 (Examples 54 and 55) using water-insoluble polycarbodiimides having different types of diisocyanates (skeleton structure of the main chain) used during the production, there was a tendency that the carbodiimide composition PC-a54 using a water-insoluble polycarbodiimide whose skeleton structures were derived only from an alicyclic isocyanate had improved water resistance (structure retention) when formed into a coating film.

On the other hand, in the carbodiimide compositions PC-b1 (Comparative Example 1), PC-b6 (Comparative Example 6), PC-b7 (Comparative Example 7), PC-b8 (Comparative Example 8), PC-b9 (Comparative Example 9), PC-b10 (Comparative Example 10) and PC-b11 (Comparative Example 11), although the low-temperature curability when used as a coating composition and the water resistance (structure retention) when formed into a coating film were good, the storage stability when used as a coating composition was poor. It was presumed that this was because the modification rate of water-soluble polycarbodiimides A-27, A-138, and A-139 contained in carbodiimide composition PC-b1 (Comparative Example 1), PC-b6 (Comparative Example 6), PC-b7 (Comparative Example 7), PC-b8 (Comparative Example 8), PC-b9 (Comparative Example 9), PC-b10 (Comparative Example 10) and PC-hi 1 (Comparative Example 11) was 0%, and the carbodiimide groups of the water-soluble polycarbodiimides A-27, A-138 and A-139 reacted with the main component during storage.

Further, in the carbodiimide compositions PC-b2 to PC-b4 (Comparative Examples 2 to 4), although storage stability when used as a coating composition was good, low-temperature curability when used as a coating composition and water resistance (structure retention, whitening resistance) when made into a coating film were poor. It was presumed that this was because the modification rates of the water-soluble modified polycarbodiimides A-28, A-6 and A-1 contained in the carbodiimide compositions PC-b2 to PC-b4 (Comparative Examples 2 to 4) were 100%, all carbodiimide groups were modified, and the reactivity was lowered, thereby making it impossible to form a crosslinked structure with the main agent component during the curing.

Further, in the carbodiimide composition PC-b5 (Comparative Example 5), although low-temperature curability when used as a coating composition and water resistance (structure retention) when formed into a coating film were good, storage stability when used as a coating composition and water resistance (whitening resistance) when formed into a coating film were poor. It was presumed that this was because all the polycarbodiimides contained in the carbodiimide composition PC-b5 (Comparative Example 5) were water-soluble polycarbodiimides, each water-soluble polycarbodiimide was in a dispersed state, and no association structure was formed, resulting in reaction of water-soluble unmodified polycarbodiimide A-29, which had a modification rate of 0% with the main component during storage.

INDUSTRIAL APPLICABILITY

According to the carbodiimide composition of the present embodiment, it is possible to provide a carbodiimide composition having excellent storage stability and low-temperature curability when used as a coating composition. The polycarbodiimide composition of the present embodiment can be suitably used as a curing agent for a water-based coating composition.

The invention claimed is:

1. A carbodiimide composition comprising a water-soluble modified polycarbodiimide (A) and a water-insoluble polycarbodiimide (B).

2. The carbodiimide composition according to claim 1, wherein a modification rate of the water-soluble modified polycarbodiimide (A) is 5% or more and 100% or less.

3. The carbodiimide composition according to claim 1, wherein an average number of carbodiimide groups per molecule of the water-soluble modified polycarbodiimide (A) is in the range of 4.0 or less.

4. The carbodiimide composition according to claim 1, wherein a mass ratio (A)/(B) of the water-soluble modified polycarbodiimide (A) to the water-insoluble polycarbodiimide (B) is 90/10 or less.

5. The carbodiimide composition according to claim 1, wherein a modification rate of the water-insoluble polycarbodiimide (B) is 70% or less.

6. The carbodiimide composition according to claim 1, wherein the modification rate of the water-insoluble polycarbodiimide (B) is lower than the modification rate of the water-soluble modified polycarbodiimide (A).

7. The carbodiimide composition according to claim 1, wherein an average number of carbodiimide groups per molecule of the water-insoluble polycarbodiimide (B) is larger than the average number of carbodiimide groups per molecule of the modified polycarbodiimide (A).

8. The carbodiimide composition according to claim 1, wherein an isocyanate of the water-soluble modified polycarbodiimide (A) is blocked with a polyalkylene glycol monoalkyl ether and/or an alkylene glycol monoalkyl ether.

9. The carbodiimide composition according to claim 1, wherein a molar ratio of the polyalkylene glycol monoalkyl ether and the alkylene glycol monoalkyl ether that block the isocyanate of the water-soluble modified polycarbodiimide (A) is 20/80 or more.

10. The carbodiimide composition according to claim 1, wherein the water-soluble modified polycarbodiimide (A) or a modifying agent of the water-insoluble polycarbodiimide (B) includes at least one selected from the group consisting of an isocyanate, a hydroxyl group-containing compound, a thiol group-containing compound, an acyclic amine, a cyclic amine, a carboxylic acid and a carboxylic acid derivative.

11. The carbodiimide composition according to claim 10, wherein at least one electron-withdrawing functional group is contained in a skeleton of the modifying agent.

12. The carbodiimide composition according to claim 10, wherein any one of a cyclic saturated hydrocarbon group having 1 or more and 12 or less carbon atoms, an acyclic saturated hydrocarbon group having 1 or more and 12 or less carbon atoms, an unsaturated hydrocarbon group having 2 or more and 8 or less carbon atoms, and a halogen atom is bonded in the skeleton of the modifying agent.

13. The carbodiimide composition according to claim 10, wherein any one of a hydroxyl group, an amino group, an ether group and a carbonyl group is bonded to the skeleton of the modifying agent.

14. The carbodiimide composition according to claim 10, wherein the water-soluble polycarbodiimide (A) or the modifying agent of the water-insoluble polycarbodiimide (B) contains at least one compound which is a hydroxyl group-containing compound and has a pKa of 7 or more and 16 or less in water.

15. The carbodiimide composition according to claim 1, wherein the water-soluble polycarbodiimide (A) or the modifying agent of the water-insoluble polycarbodiimide (B) contains at least one compound which is a carboxylic acid and has a pKa of 4.8 or less in water.

16. A curing agent composition comprising the carbodiimide composition according to claim 1 and water.

17. The curing agent composition according to claim 16, further comprising a surfactant.

18. A coating composition comprising the curing agent composition according to claim 16 and a compound having a carboxyl group.

19. A cured resin product obtained by curing the coating composition according to claim 18.

20. The carbodiimide composition according to claim 12, wherein a molar ratio of the polyalkylene glycol monoalkyl ether and the alkylene glycol monoalkyl ether that block the isocyanate of the water-soluble modified polycarbodiimide (A) is 20/80 or more.

* * * * *